US006780555B2

(12) United States Patent
Uchida et al.

(10) Patent No.: US 6,780,555 B2
(45) Date of Patent: Aug. 24, 2004

(54) BLACK MAGNETIC IRON OXIDE PARTICLES AND MAGNETIC TONER

(75) Inventors: Naoki Uchida, Otake (JP); Minoru Kouzawa, Hiroshima (JP); Hiromitsu Misawa, Hatsukaichi (JP); Koso Aoki, Hiroshima (JP); Suehiko Miura, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 128 days.

(21) Appl. No.: 10/051,376

(22) Filed: Jan. 22, 2002

(65) Prior Publication Data

US 2002/0168523 A1 Nov. 14, 2002

(30) Foreign Application Priority Data

Jan. 23, 2001 (JP) ........................................ 2001-15115

(51) Int. Cl.$^7$ ......................... G03G 9/083; B32B 9/000

(52) U.S. Cl. ............................... 430/106.2; 252/62.56; 252/62.58; 252/62.59; 252/62.6; 252/62.62; 252/62.63; 106/456; 428/403

(58) Field of Search ...................... 430/106.2; 106/456; 252/62.56, 67.58, 62.59, 62.6, 62.62, 62.63; 428/403

(56) References Cited

U.S. PATENT DOCUMENTS

| | | | | |
|---|---|---|---|---|
| 4,657,816 A | | 4/1987 | Siddiq | |
| 5,449,565 A | * | 9/1995 | Aoki et al. | 428/694 |
| 5,498,512 A | * | 3/1996 | James et al. | 430/496 |
| 6,383,637 B1 | * | 5/2002 | Misawa et al. | 428/403 |

FOREIGN PATENT DOCUMENTS

| | | | | |
|---|---|---|---|---|
| EP | 0 400 556 | | 12/1990 | |
| EP | 0 622 426 A1 | | 11/1994 | |
| EP | 0 949 027 A1 | | 10/1999 | |
| EP | 1063639 A1 | * | 12/2000 | G11B/5/712 |
| JP | 63061413 A | * | 3/1988 | G11B/5/706 |
| JP | 2000-344528 | | 12/2000 | |

* cited by examiner

*Primary Examiner*—Christopher Rodee
(74) *Attorney, Agent, or Firm*—Nixon & Vanderhye P.C.

(57) ABSTRACT

Black magnetic iron oxide particles having an average particle diameter of 0.05 to 1.0 μm have a three-phase structure comprising:

a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles;

a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; and an intermediate layer disposed between the core portion and the surface coat portion, containing substantially none of the metal elements other than Fe.

16 Claims, 2 Drawing Sheets

BLACK MAGNETIC IRON OXIDE PARTICLES AND MAGNETIC TONER

BACKGROUND OF THE INVENTION

The present invention relates to black magnetic iron oxide particles and a magnetic toner, and more particularly, to black magnetic iron oxide particles having not only excellent blackness and electrification property, but also excellent environmental stability capable of maintaining a stable charge amount thereon even under low-temperature and low-humidity conditions or high-temperature and high-humidity conditions, and a magnetic toner using the black magnetic iron oxide particles.

The black magnetic iron oxide particles of the present invention have a black color and, therefore, are useful as black color pigments for paints, printing inks, rubber or resin compositions, or the like, and further as black magnetic particles for magnetic toner.

Magnetite particles are known as typical black pigments, and have been generally used for a long time as colorants for paints, printing inks, cosmetics, rubber or resin compositions, or the like.

In particular, the magnetite particles have been more frequently used as black magnetic iron oxide particles for magnetic toners of one component system in which composite particles obtained by mixing and dispersing black magnetic iron oxide particles in resin are used as a developer.

With recent tendency toward high-speed copying and high-image quality for laser beam printers or digital copying machines, it has been strongly required to improve properties of a magnetic toner used as a developer. For this purpose, the magnetic toner has been required to exhibit not only a sufficient blackness and an improved electrification property, but also an excellent environmental stability capable of maintaining a stable charge amount thereon without any adverse influence due to change in temperature or humidity.

Also, in order to satisfy the above requirements of the magnetic toner, it has been strongly required to improve properties of black magnetic iron oxide particles used in the magnetic toner.

Namely, in order to obtain magnetic toners exhibiting excellent blackness, electrification property and environmental stability, the black magnetic iron oxide particles used therein have been required not only to have a sufficient blackness and an adequate FeO content as well as more excellent dispersibility and electrical properties, but also to exhibit an excellent environmental stability.

It is known that the blackness of the black magnetic iron oxide particles varies depending upon the amount of $Fe^{2+}$ (FeO) contained therein. Therefore, in order to obtain the particles having an excellent blackness, the FeO content thereof has been required to be large.

In the consideration of good electrical properties, it is preferred that the black magnetic iron oxide particles have a small FeO content. Namely, the electrical resistance value of the black magnetic iron oxide particles varies depending upon the FeO content. The larger the FeO content, the lower the electrical resistance value, so that it is difficult to use the black magnetic iron oxide particles as a starting material of the magnetic toner. Therefore, the black magnetic iron oxide particles are required not only to exhibit well-balanced blackness and electrical resistance, but also to have an adequate blackness and a high electrical resistance.

Also, the electrification property of the magnetic toner largely depends upon the surface conditions of the black magnetic iron oxide particles exposed to the surface of the magnetic toner. In particular, as described above, FeO contained in the black magnetic iron oxide particles acts for reducing an electrical resistance of the magnetic toner. Therefore, the electrification property of the magnetic toner is considerably influenced by the content of FeO and the distribution of FeO in each black magnetic iron oxide particle. In this regard, Japanese Patent Application Laid-Open (KOKAI) No. 4-338971 describes that "the distribution condition of Fe(II) in the surface layer of magnetic iron oxide more highly contributes to stable frictional electrification property of the obtained magnetic toner under various environmental conditions rather than the FeO content".

The dispersibility of the black magnetic iron oxide particles largely depends upon the surface conditions thereof. Therefore, in order to improve the surface conditions of the black magnetic iron oxide particles and enhance the dispersibility thereof, it has been attempted to coat surfaces of the black magnetic iron oxide particles with a silicon compound, an aluminum compound or the like. In addition, the black magnetic iron oxide particles are fine particles and, therefore, tend to be magnetically agglomerated, resulting in the deterioration of the blending property with resins. Consequently, it has been required to prevent the black magnetic iron oxide particles from being magnetically agglomerated.

Further, the magnetic toner is required to exhibit stable properties even upon any change in environmental conditions, for example, under low-temperature and low-humidity conditions or under high-temperature and high-humidity conditions. For this reason, the black magnetic iron oxide particles used in the magnetic toner have been strongly required to have an excellent environmental stability and constantly exhibit a stable charge amount.

Hitherto, it has been attempted to improve various properties of the black magnetic iron oxide particles by incorporating different kinds of elements other than iron thereinto, and coating the surface thereof with a plurality of layers (Japanese Patent Application Laid-Open (KOKAI) Nos. 7-240306(1995), 7-267646(1995), 8-48524(1996), 8-50369(1996), 8-101529(1996), 11-157843(1999), 11-189420(1999), 11-314919(1999), 2000-239021, 2000-272923, 2000-335920, 2000-335921, 2000-344527, 2000-344528 and 2000-10821, or the like).

At present, it has been strongly demanded to provide black magnetic iron oxide particles satisfying various properties described above. However, black magnetic iron oxide particles capable of fulfilling these requirements cannot be obtained conventionally.

That is, Japanese Patent Application Laid-Open (KOKAI) No. 7-240306(1995) describes magnetic particles containing silicon inside thereof, having a co-precipitate of silica and alumina present on the surface thereof, and further having fine non-magnetic oxide particles or fine non-magnetic oxide hydroxide particles adhered onto the co-precipitate, which comprise an element selected from the group consisting of Fe, Ti, Zr, Si and Al. Thus, the magnetic particles have an outermost layer composed of the fine non-magnetic particles and, therefore, fail to form a ferrite structure, thereby failing to show an excellent environmental stability.

In Japanese Patent Application Laid-Open (KOKAI) No. 7-267646(1995), it is described that magnetite particles have an outer-shell portion containing at least one metal element selected from the group consisting of Zn, Mn, Cu, Ni, Co, Mg, Cd, Al, Cr, V, No, Ti and Sn. However, since the magnetite particles have a two phase structure, the electrical resistance value thereof is low, and the build-up of electrification and the electrification stability thereof are unsatisfactory.

Japanese Patent Application Laid-Open (KOKAI) No. 8-48524(1996) describes magnetite particles successively coated with an iron-zinc oxide thin film and an iron-silicon oxide thin film on the surface thereof. The magnetite particles show a low electrical resistance value since the outermost layer thereof is not composed of spinel iron oxide containing different kinds of metal elements. Further, the build-up of electrification as well as the electrification stability thereof are unsatisfactory.

Japanese Patent Application Laid-Open (KOKAI) No. 8-50369(1996) describes magnetic particles containing silicon locally present on the surface portion thereof and further containing Zn, Mg or Mn. However, the magnetic Particles not only show a low electrical resistance value, but also are unsatisfactory in build-up of electrification as well as electrification stability. Further, the magnetic particles fail to show an excellent environmental stability because of moisture-absorbing property thereof.

Japanese Patent Application Laid-Open (KOKAI) No. 8-101529(1996) describes magnetic particles coated with an iron-zinc oxide thin film. However, the magnetic particles not only show a low electrical resistance value, but also are unsatisfactory in build-up of electrification as well as electrification stability. In addition, the magnetic particles also fail to show an excellent environmental stability because of moisture-absorbing property thereof.

Japanese Patent Application Laid-Open (KOKAI) No. 11-157843(1999) describes magnetite particles containing silicon component continuously distributed from center to surface of each particle and exposed to the surface thereof, and having an outer-shell coat composed of a metal compound containing a metal component selected from the group consisting of Zn, Mn, Cu, Ni, Co, Cr, Cd, Al, Sn, Mg and Ti which is bonded to the silicon component. However, the magnetite particles fail to show a good build-up of electrification because of containing no metal component inside thereof.

Japanese Patent Application Laid-Open (KOKAI) No. 11-189420(1999) describes magnetite particles containing silicon and aluminum components continuously distributed from center to surface of each particle and exposed to the surface thereof, and having an outer-shell coat composed of a metal compound containing a metal component selected from the group consisting of Zn, Mn, Cu, Ni, Co, Cr, Cd, Sn, Mg and Ti which is bonded to the silicon and aluminum components. However, the magnetite particles also fail to show a good build-up of electrification because of containing no metal component inside thereof.

Japanese Patent Application Laid-Open (KOKAI) No. 11-314919(1999) describes magnetite particles having a first coat containing hydrated alumina or alumina sol, and a second coat formed on the first coat, which comprises silica particles produced from colloidal silica. However, since these coats are not ferrite, the magnetite particles exhibit a low electrical resistance value, and are unsatisfactory in build-up of electrification as well as electrification stability. Further, the magnetite particles fail to exhibit an excellent environmental stability because of moisture-absorbing property thereof.

Japanese Patent Application Laid-Open (KOKAI) No. 2000-239021 describes iron oxide particles coated with an Al—Fe composite oxide layer. However, the iron oxide particles exhibit a low electrical resistance value, and are unsatisfactory in build-up of electrification as well as electrification stability.

Japanese Patent Application Laid-Open (KOKAI) No. 2000-272923 describes iron oxide particles containing a silicon component continuously distributed from center to surface of each particle, and having a coating layer composed of a metal compound containing a metal component selected from the group consisting of Zn, Mn, Cu, Ni, Co, Cr, Cd, Al, Sn, Mg and Ti which is bonded to the silicon component, wherein a core portion thereof to which the silicon component is exposed, is coated with an Al component. Since the metal component is present in the form of an outer shell, the iron oxide particles show low residual magnetization, low coercive force and high electrical resistance, so that the charge amount thereof can be adequately controlled. However, the iron oxide particles are still insufficient in build-up of electrification.

Japanese Patent Application Laid-Open (KOKAI) No. 2000-335920 describes iron oxide particles containing at least one element selected from the group consisting of Mg, Na, K, Ca, Li, Ti, S, Al, Si, B and C wherein the total amount of the above elements contained in a portion extending inwardly from a surface of each particle which corresponds to not more than 80% by weight of the particle, is not less than 95% by weight based on the total weight of the elements contained in the particle. However, since the iron oxide particles are the raw particles for providing magnetic particles having a low specific gravity, the iron oxide particles are unsatisfactory in electrification property.

Japanese Patent Application Laid-Open (KOKAI) No. 2000-335921 describes iron oxide particles coated with a composite oxide thin film containing iron, silicon and at least one element selected from the group consisting of Al, Ce, Mo, W and P. However, the iron oxide particles are unsatisfactory in build-up of electrification.

Japanese Patent Application Laid-Open (KOKAI) No. 2000-344527 describes iron oxide particles having a composite oxide of Si and Fe present on the surface thereof, and Japanese Patent Application Laid-Open (KOKAI) No. 2000-344528 describes iron oxide particles having a lower coat composed of a composite oxide of Si and Fe and an upper coat composed of Al component. However, these iron oxide particles are still unsatisfactory in environmental stability since the particles are not coated with ferrite containing different kinds of metal elements.

Japanese Patent Application Laid-Open (KOKAI) No. 2001-10821 describes iron oxide particles having a coat composed of a composite oxide of zinc and iron, and further a coat formed on the composite oxide coat, which is composed of a composite oxide of zinc and iron or a zinc compound. However, the iron oxide particles fail to show an excellent electrification property.

As a result of the present inventors' earnest studies, it has been found that black granular spinel iron oxide particles having a three-phase structure comprising a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; and an intermediate layer disposed between the core portion and the surface coat portion which substantially do not contain any of the above metal elements other than Fe, can exhibit not only excellent blackness and electrification property, but also excellent environmental stability capable of maintaining stable charge amount even under low-temperature and low-humidity conditions or high-temperature and high-humidity conditions. The present invention has been attained based on the finding.

SUMMARY OF THE INVENTION

An object of the present invention is to provide black magnetic iron oxide particles exhibiting not only excellent blackness and electrification property, especially excellent build-up of electrification, but also excellent environmental stability.

Another object of the present invention is to provide a magnetic toner exhibiting not only excellent blackness and electrification property, especially excellent build-up of electrification, but also excellent environmental stability.

A further object of the present invention is to provide a black color pigment for paints, printing inks, rubber or resin compositions, etc., having an excellent blackness.

To accomplish the aim, in a first aspect of the present invention, there are provided black magnetic iron oxide particles having a three-phase structure comprising:

a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles;

a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; and an intermediate layer disposed between the core portion and the surface coat portion, containing substantially none of the metal elements other than Fe, and having an average particle diameter of 0.05 to 1.0 $\mu$m.

In a second aspect of the present invention, there are provided black magnetic iron oxide particles having an average particle diameter of 0.05 to 1.0 $\mu$m and a three-phase structure comprising:

a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles;

a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; and an intermediate layer disposed between the core portion and the surface coat portion, containing substantially none of the metal elements other than Fe, and having a coating comprising an organic compound having a hydrophobic group formed on the surface coat portion.

In a third aspect of the present invention, there are provided black magnetic iron oxide particles having an average particle diameter of 0.05 to 1.0 $\mu$m and a three-phase structure comprising:

a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles;

a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; and an intermediate layer disposed between the core portion and the surface coat portion, containing substantially none of the metal elements other than Fe, and having a coating comprising at least one compound selected from the group consisting of hydroxides of aluminum, oxides of aluminum, hydroxides of silicon and oxides of silicon on the surface coat portion.

In a fourth aspect of the present invention, there are provided black magnetic iron oxide particles having an average particle diameter of 0.05 to 1.0 $\mu$m and a three-phase structure comprising:

a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles;

a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; and an intermediate layer disposed between the core portion and the surface coat portion, containing substantially none of the metal elements other than Fe, and having a coating comprising fine oxide particles composed of an element selected from the group consisting of Al, Si, Zr and Ti on the surface coat portion.

In a fifth aspect of the present invention, there are provided black magnetic iron oxide particles having an average particle diameter of 0.05 to 1.0 $\mu$m and a three-phase structure comprising:

a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles;

a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; and an intermediate layer disposed between the core portion and the surface coat portion, containing substantially none of the metal elements other than Fe, and having a coating comprising fine oxide particles coated with at least one compound selected from the group consisting of methylsilane, trimethylsilane and octylsilane on the surface coat portion.

In a six aspect of the present invention, there is provided a magnetic toner comprising a binder resin and black magnetic iron oxide particles having a three-phase structure comprising:

a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles;

a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles and an intermediate layer disposed between the core portion and the surface coat portion, containing substantially none of the metal elements other than Fe, and having an average particle diameter of 0.05 to 1.0 $\mu$m.

In a seventh aspect of the present invention, there is provided a black color pigment comprising black magnetic iron oxide particles having a three-phase structure comprising:

a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles;

a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; and an intermediate layer disposed between the core portion and the surface coat portion, containing substantially none of the metal elements other than Fe, and having an average particle diameter of 0.05 to 1.0 $\mu$m.

In an eighth aspect of the present invention, there are provided black magnetic iron oxide particles having an average particle diameter of 0.05 to 1.0 $\mu$m and a three-phase structure comprising:

a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles;

a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; and an intermediate layer disposed between the core portion and the surface coat portion, containing substantially none of the metal elements other than Fe, wherein a silicon compound is present in the intermediate layer, the surface coat portion, or the intermediate layer and the surface coat portion of the black magnetic iron oxide particles.

BRIEF DESCRIPTION OF DRAWINGS

FIG. 1*a* and FIG. 1*b* are graphs obtained by plotting contents of different metal elements other than Fe based on dissolution percentage of Fe in black magnetic iron oxide particles obtained in Example 1, wherein FIG. 1*a* is a view showing an integrated value of dissolution percentage of Mn element based on each point of the Fe dissolution percentage, and FIG. 1*b* is a view showing an amount of in dissolved at each point of Fe dissolution percentage as determined on the basis of FIG. 1*a*.

DETAILED DESCRIPTION OF THE INVENTION

Figure 1A:
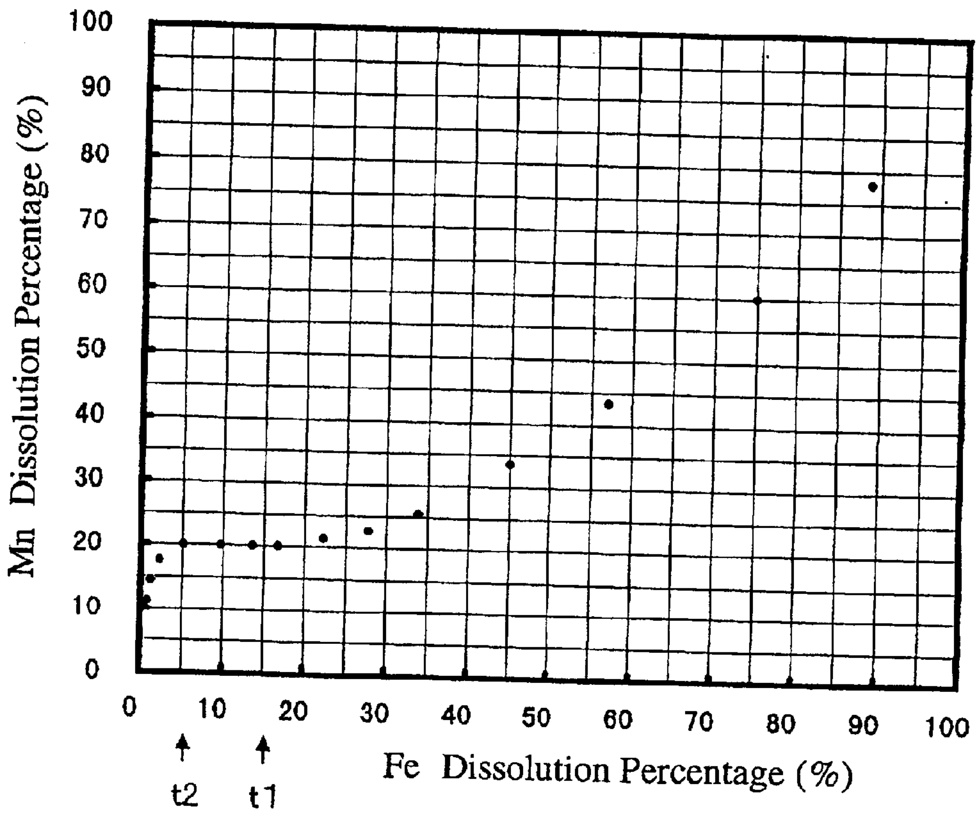

The present invention is described in detail below.

First, the black magnetic iron oxide particles according to the present invention are explained.

The black magnetic iron oxide particles according to the present invention have a three-phase structure comprising a core portion, a surface coat portion and an intermediate layer disposed between the core portion and the surface coat portion. The core portion and the surface coat portion both contain inside thereof at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles (hereinafter referred to as "different metal element or elements"). The intermediate layer substantially does not contain any of the different metal elements other than Fe.

The black magnetic iron oxide particles of the present invention have a particle shape such as a hexahedral shape, an octahedral shape, a polyhedral shape, a granular shape, a spherical shape or the like.

The core portion of the black magnetic iron oxide particles of the present invention means a phase composed of spinel iron oxide containing at least one of the different metal element which extends outwardly from the center of each particle up to an interface of the intermediate layer containing no different metal element. The intermediate layer means a phase composed of spinel iron oxide containing substantially no different metal element which is present outside the core portion. Further, the surface coat portion means a phase composed of spinel iron oxide containing at least one of the different metal element which is present outside the intermediate layer.

The content of the different metal element contained in each of the core portion and the surface coat portion is usually 0.1 to 10% by weight, preferably 0.1 to 8.0% by weight, more preferably 0.1 to 5.0% by weight (calculated as the respective different metal element) based on whole Fe contained in the particles. When the content of the different metal element is less than 0.1% by weight, the obtained iron oxide particles tend to show a low electrical resistance value, so that it may be difficult to obtain a good electrification property. When the content of the different metal element is more than 10% by weight, the obtained iron oxide particles tend to be deteriorated in blackness.

In the core portion and the surface coat portion, the different metal element may be contained either uniformly or with a suitable concentration gradient.

The content of the different metal element in the black magnetic iron oxide particles of the present invention is usually 0.1 to 20% by weight, preferably 0.1 to 10% by weight (calculated as the respective metal element) based on the total weight of the black magnetic iron oxide particles.

The intermediate layer contains substantially no different metal element. In general, raw materials or the like used for production of the black magnetic iron oxide particles may inevitably contain these different metal elements as impurities. Therefore, in the case where the intermediate layer inevitably contains the different metal elements as impurities, the content of the different metal elements is preferably not more than 100 ppm.

Further, in the present invention, the amount (depth) of each of the surface coat portion, intermediate layer and core portion of the black magnetic iron oxide particles is expressed by Fe dissolution percentage (%) as measured from the surface of the particles as described hereinafter. That is, the interface between the surface coat portion and the intermediate layer exists in the region where the Fe dissolution percentage as measured from the surface of the particles is in the range of usually 2 to 40%, preferably 4 to 30%. The interface between the intermediate layer and the core portion exists in the region where the Fe dissolution percentage as measured from the surface of the particles is in the range of usually 10 to 70%. Namely, the surface coat portion is a portion where the Fe dissolution percentage as measured from the surface of the particles is up to 40% at most, and the core portion is at most a portion extending from where the Fe dissolution percentage as measured from the surface of the particles is 10% to the center of the respective particles (where the Fe dissolution percentage as measured from the surface of the particles is 100%). The intermediate layer is a remainder portion of the respective particles except for the surface coat portion and the core portion, and corresponds to a portion where the Fe dissolution percentage as measured from the surface of the respective particles is in the range of preferably from 2% to less than 70%, more preferably from 4% to less than 70%. When the amounts of the surface coat portion, intermediate layer and core portion are out of the above-specified ranges, it may be difficult to obtain black magnetic iron oxide particles having a sufficient blackness and a good electrification property.

Meanwhile, in the present invention, the black spinel iron oxide constituting respective layers, i.e., the intermediate layer and the surface coat portion, may be of a layer structure made from the fine particles or a fine particle layer structure composed of agglomerates of a large number of the fine particles.

The black magnetic iron oxide particles of the present invention may contain a silicon element in the intermediate layer and/or the surface coat portion of the respective particles. The amount of the silicon element contained in the black magnetic iron oxide particles is preferably 0.05 to 5% by weight (calculated as $SiO_2$) based on the weight of the black magnetic iron oxide particles. In particular, in the case where the silicon compound is present in the surface coat portion, the obtained black magnetic iron oxide particles are enhanced in fluidity. Further, when the black magnetic iron oxide particles are used to produce a magnetic toner, the fluidity of the obtained magnetic toner can also be enhanced. However, when an excess amount of the silicon compound is contained, the obtained black magnetic iron oxide particles exhibit high moisture-absorbing property, so that the electrical resistance value thereof may be deteriorated.

The black magnetic iron oxide particles of the present invention have an average particle diameter of usually 0.05 to 1.0 μm, preferably 0.05 to 0.5 μm. When the average particle diameter is less than 0.05 μm, since the cohesion force between the particles becomes large, it may be difficult to obtain black magnetic iron oxide particles having a good dispersibility. When the average particle diameter is more than 1.0 μm, the number of magnetic particles contained in one magnetic toner particle is too small, so that the distribution of magnetic particles in respective magnetic toner particles tends to become uneven. As a result, the obtained magnetic toner tends to be deteriorated in uniformity of electrification property.

The black magnetic iron oxide particles of the present invention have an a* value of usually not more than 1.0. The lower limit thereof is preferably −1. When the a* value is more than 1.0, the obtained black magnetic iron oxide particles may exhibit a strong reddish color and, therefore, are deteriorated in blackness.

The FeO content of the whole black magnetic iron oxide particles of the present invention is preferably 16.0 to 28.0% by weight. When the FeO content is less than 16.0% by weight, the obtained black magnetic iron oxide particles tend to be deteriorated in blackness. When the FeO content is more than 28.0% by weight, the obtained black magnetic iron oxide particles tend to be deteriorated in electrical resistance.

The black magnetic iron oxide particles of the present invention have a BET specific surface area value of usually 3.0 to 18.0 $m^2/g$, preferably 3.0 to 15.0 $m^2/g$.

The black magnetic iron oxide particles of the present invention have a saturation magnetization value of usually 70.0 to 95.0 $Am^2/kg$ (70.0 to 95.0 emu/g), preferably 75.0 to 95.0 $Am^2/kg$ (75.0 to 95.0 emu/g).

The black magnetic iron oxide particles of the present invention have an electrical resistance value of usually not less than $1\times10^6$ Ω·cm, preferably not less than $1\times10^7$ Ω·cm.

The black magnetic iron oxide particles of the present invention have an electrification saturation time of usually not more than 10 minutes, preferably not more than 5 minutes when measured by the method described hereinafter.

At least a part of the surface of the black magnetic iron oxide particles may be coated with the following materials.

(1) A organic compound having a hydrophobic group;

(2) Hydroxides and/or oxides of aluminum and/or silicon:

(3) Fine particles composed of an element selected from the group consisting of Al, Si, Zr and Ti:

(4) Fine oxide particles composed of an element selected from the group consisting of Al, Si, Zr and Ti, which are coated with at least one silane compound selected from the group consisting of methylsilane, trimethylsilane and octylsilane.

The respective coating layers are explained in detail below.

(1) Coating of the Surface of the Black Magnetic Iron Oxide Particle with an Organic Compound having a Hydrophobic Group At least a part of the surface of the black magnetic iron oxide particle according to the present invention may be coated with the coating layer comprising an organic compound having a hydrophobic group. By forming the coating layer comprising an organic compound having a hydrophobic group on the surface of each black magnetic iron oxide particle, it is possible to enhance the dispersibility of the black magnetic iron oxide particles in resins used for a magnetic toner. When the black magnetic iron oxide particles are coated with organic compounds having functional groups other than hydrophobic groups, the black magnetic iron oxide particles have a poor compatibility with the resins, resulting in deteriorated dispersibility.

As the organic compounds having a hydrophobic group, there may be used coupling agents such as titanate-based coupling agents and silane-based coupling agents, or ordinary surfactants.

Examples of the titanate-based coupling agents having a hydrophobic group may include isopropyl triisostearoyl titanate, isopropyl tridecylbenzene sulfonyl titanate, isopropyl tris(dioctylpyrophosphate)titanate, bis(dioctyl pyrophosphate)oxyacetate titanate, bis (dioctylpyrophosphate)ethylene titanate or the like.

Examples of the silane-based coupling agents having a hydrophobic group may include vinyl trimethoxysilane, γ-glycidoxypropyl trimethoxysilane, γ-methacyloxypropyl methoxysilane, phenyl trimethoxysilane and decyl triethoxysilane or the like.

Examples of the ordinary surfactants may include known surfactants, e.g., anionic surfactants such as phosphate-based surfactants or nonionic surfactants such as fatty acid ester-based surfactants, natural fat and oil derivatives such as alkyl amines, or the like.

The coating amount of the organic compound having a hydrophobic group is preferably 0.5 to 5 parts by weight, more preferably 1 to 3 parts by weight based on 100 parts by weight of the black magnetic iron oxide particle to be treated. When the coating amount of the organic compound having a hydrophobic group is less than 0.5 parts by weight, it may be difficult to impart a sufficient hydrophobic property to the black magnetic iron oxide particle, so that the compatibility with the resins may become poor. When the coating amount of the organic compound is more than 5 parts by weight, the obtained magnetic particles may be deteriorated in saturation magnetization since the amount of components not contributing to improvement in magnetic properties thereof is increased, thereby failing to provide magnetic particles suitable for magnetic toners.

(2) Coating of the Surface of the Black Magnetic Iron Oxide Particle with Hydroxides and/or Oxides of Aluminum and/or Silicon At least a part of the surface of the black magnetic iron oxide particle according to the present invention may be preferably coated with the hydroxides and/or the oxides of aluminum and/or silicon. By coating the surface of each black magnetic iron oxide particle with the hydroxides and/or the oxides of aluminum and/or silicon, the black magnetic iron oxide particles exhibit a good compatibility with resins, resulting in improved dispersibility thereof.

The coating amount of the hydroxides and/or oxides of aluminum is preferably 0.01 to 0.5% by weight, more preferably 0.05 to 0.3% by weight (calculated as Al element) based on the weight of the black magnetic iron oxide particles to be treated. When the coating amount thereof is less than 0.01% by weight, the surface coat portioning effect may not be sufficiently exhibited. When the coating amount thereof is more than 0.5% by weight, the obtained black magnetic iron oxide particles coated with the hydroxides and/or oxides of aluminum undergo a high moisture absorption, so that the electrical properties thereof may be deteriorated.

The coating amount of the hydroxides and/or oxides of silicon is preferably 0.01 to 0.5% by weight, more preferably 0.05 to 0.3% (calculated as $SiO_2$) based on the weight of the black magnetic iron oxide particles. When the coating amount thereof is less than 0.01% by weight, the surface coat portioning effect may not be sufficiently exhibited. When the coating amount thereof is more than 0.5% by weight, the obtained black magnetic iron oxide particles coated with the hydroxides and/or oxides of silicon may undergo a high moisture absorption, so that the electrical properties thereof may be deteriorated.

(3) Adhesion of Fine Oxides Particles Composed of at Least One Element Selected from the Group Consisting of Al, Si, Zr and Ti on the Surface of the Black Magnetic Iron Oxide Particle Fine particles of oxides of at least one element selected from the group consisting of Al, Si, Zr and Ti may be adhered or deposited onto at least a part of the surface of the black magnetic iron oxide particle. By coating the surface of each black magnetic iron oxide particle with the fine oxides particles of at least one element selected from the group consisting of Al, Si, Zr and Ti, the black magnetic iron oxide particles exhibit an enhanced flowability and an excellent durability. The average particle diameter of the fine oxides particles adhered on the surface of the black magnetic iron oxide particles is usually 5 to 100 nm, preferably 5 to 50 nm.

The amount of the fine oxides particles adhered is preferably 0.1 to 5% by weight, more preferably 0.5 to 3.0% by weight (calculated as oxide thereof) based on the weight of the black magnetic iron oxide particles to be treated.

When the amount of the fine oxides particles adhered is less than 0.1% by weight, it may become difficult to improve the flowability of the black magnetic iron oxide particles, so that the flowability of a magnetic toner obtained therefrom may be deteriorated. When the amount of the fine oxides particles adhered is more than 5% by weight, the black magnetic iron oxide particles may undergo a high water absorption under high-temperature and high-humidity conditions, so that the flowability of a magnetic toner obtained therefrom may be deteriorated. Further, since the content of the fine oxides particles as components not contributing to magnetic properties of the black magnetic iron oxide particles is increased, the saturation magnetization values of not only the black magnetic iron oxide particles but also the magnetic toner may be deteriorated.

(4) Adhesion of Fine Oxide Particles Obtained by Coating the Surface of the Fine Oxide Particle as Described in the above (3) with at Least One Silane Compound Selected from the Group Consisting of Methylsilane, Trimethylsilane and Octylsilane, onto the Surface of the Black Magnetic Iron Oxide Particles In the case where fine oxide particles obtained by coating the surface of the fine oxide particle as described in the above (3) with at least one silane compound selected from the group consisting of methylsilane, trimethylsilane and octylsilane (hereinafter referred to as "silane compound-treated fine particles"), are adhered onto at least a part of the surface of the black iron oxide particles, the obtained black magnetic iron oxide particles can exhibit not only an improved flowability, but also a higher electrical resistance value due to repellency of the silane compound. The amount of the silane compound coated is preferably 1 to 10% by weight based on the weight of the fine oxide particles. The average particle diameter of the fine oxide particles adhered on the surface of the black magnetic iron oxide particles is usually 5 to 100 nm, preferably 5 to 50 nm.

The amount of the silane compound-treated fine particles adhered is preferably 0.1 to 5.0% by weight, more preferably 0.5 to 3.0% by weight based on the weight of the black magnetic iron oxide particles. When the amount of the silane compound-treated fine particles adhered is less than 0.1% by weight, it may be difficult to further improve fluidity of the black magnetic iron oxide particles. As a result, it may also be difficult to further improve fluidity of a magnetic toner produced from the black magnetic iron oxide particles. When the amount of the silane compound-treated fine particles adhered is more than 5.0% by weight, although the effect of the present invention can be obtained, the obtained black magnetic iron oxide particles may be deteriorated in saturation magnetization since the amount of components not contributing to improvement in magnetic properties thereof is increased, thereby failing to provide black magnetic iron oxide particles suitable for magnetic toners.

The surface coat portioned black magnetic iron oxide particles as described in the above (1) to (4) exhibit the following properties.

(1) The black magnetic iron oxide particles coated with an organic compound having a hydrophobic group, have an a* value of usually not more than 1.0; a FeO content of usually 16.0 to 28.0% by weight based on whole particles; a BET specific surface area value of usually 3 to 18 $m^2/g$, preferably 3.0 to 15.0 $m^2/g$; a saturation magnetization value of usually 60.0 to 95.0 $Am^2/kg$ (60.0 to 95.0 emu/g), preferably 65.0 to 95.0 $Am^2/kg$ (65.0 to 95.0 emu/g); an electrical resistance value of usually not less than $1\times10^6$ $\Omega\cdot cm$, preferably not less than $1\times10^7$ Ω·cm; an electrification saturation time of usually not more than 10 minutes, preferably 5 minutes; an liquid absorption of usually not more than 15 ml/100 g, preferably not more than 10 ml/100 g; and a gloss of a resin film surface of the sheet-like kneaded material of a styrene-acrylic resin at incident and reflection angles of 20° of usually not less than 85%, preferably not less than 90%.

(2) The black magnetic iron oxide particles coated with at least one compound selected from the group consisting of hydroxides of aluminum, oxides of aluminum, hydroxides of silicon and oxides of silicon, have an a* value of usually not more than 1.0; a FeO content of usually 16.0 to 28.0% by weight based on whole particles; a BET specific surface area value of usually 3.0 to 23.0 $m^2/g$, preferably 3.0 to 20.0 $m^2/g$; a saturation magnetization value of usually 70.0 to 95.0 $Am^2/kg$ (70.0 to 95.0 emu/g), preferably 75.0 to 95.0 $Am^2/kg$ (75.0 to 95.0 emu/g); an electrical resistance value of usually not less than $1\times10^6$ Ω·cm, preferably not less than $1\times10^7$ Ω·cm; an electrification saturation time of usually not more than 10 minutes, preferably 5 minutes; a compression (compaction) degree of usually not more than 50, preferably not more than 45; and an oil absorption of usually not more than 20 ml/100 g, preferably not more than 18 ml/100 g.

(3) The black magnetic iron oxide particles on which fine oxide particles composed of at least one element selected from the group consisting of Al, Si, Zr and Ti are adhered, have an a* value of usually not more than 1.0; a FeO content of usually 16.0 to 28.0% by weight based on whole particles; a BET specific surface area value of usually 3.0 to 23.0 $m^2/g$, preferably 3.0 to 20.0 $m^2/g$; a saturation magnetization value of usually 70.0 to 95.0 $Am^2/kg$ (70.0 to 95.0 emu/g), preferably 75.0 to 95.0 $Am^2/kg$ (75.0 to 95.0 emu/g); an electrical resistance value of usually not less than $1\times10^6$ Ω·cm, preferably not less than $1\times10^7$ Ω·cm; an electrification saturation time of usually not more than 10 minutes, preferably 5 minutes; a compression (compaction) degree of usually not more than 50, preferably not more than 45; and an oil absorption of usually not more than 20 ml/100 g, preferably not more than 18 ml/100 g.

(4) The black magnetic iron oxide particles on which fine oxide particles composed of at least one element selected from the group consisting of Al, Si, Zr and Ti obtained by coating the surface of the fine oxide particles with at least one silane compound selected from the group consisting of methylsilane, trimethylsilane and octylsilane, are adhered, have an a* value of usually not more than 1.0; a FeO content of usually 16.0 to 28.0% by weight based on whole particles; a BET specific surface area value of usually 3.0 to 23.0 $m^2/g$, preferably 3.0 to 20.0 $m^2/g$; a saturation magnetization value of usually 60.0 to 95.0 $Am^2/kg$ (60.0 to 95.0 emu/g), preferably 65.0 to 95.0 $Am^2/kg$ (65.0 to 95.0 emu/g); an electrical resistance value of usually not less than $1\times10^6$ Ω·cm, preferably not less than $1\times10^7$ Ω·cm; an electrification saturation time of usually not more than 10 minutes, preferably 5 minutes; a compression (compaction) degree of usually not more than 50, preferably not more than 45; and an oil absorption of usually not more than 20 ml/100 g, preferably not more than 18 ml/100 g.

A black color pigment according to the present invention comprises the black magnetic iron oxide particles.

Next, the magnetic toner according to the present invention is described.

The magnetic toner according to the present invention comprises the black magnetic iron oxide particles and a binder resin The magnetic toner may further contain a mold release agent, a colorant, a charge-controlling agent and other additives, if necessary.

The magnetic toner according to the present invention has an average particle size of usually 3 to 15 μm, preferably 5 to 12 μm.

The amount of the binder resin used in the magnetic toner is usually 50 to 900 parts by weight, preferably 50 to 400 parts by weight based on 100 parts by weight of the black magnetic iron oxide particles.

As the binder resins, there may be used vinyl-based polymers, i.e., homopolymers or copolymers of vinyl-based monomers such as styrene, alkyl acrylates and alkyl methacrylates. As the styrene monomers, there may be exemplified styrene and substituted styrenes. As the alkyl acrylate monomers, there may be exemplified acrylic acid, methyl acrylate, ethyl acrylate, butyl acrylate or the like. It is preferred that the above copolymers contain styrene-based components in an amount of usually 50 to 95% by weight.

In the binder resin used in the present invention, the above-mentioned vinyl-based polymers may be used in combination with polyester-based resins, epoxy-based resins, polyurethane-based resins or the like, if necessary.

The magnetic toner according to the present invention may be produced by a known method of mixing and kneading a predetermined amount of a binder resin and a predetermined amount of the black magnetic iron oxide particles together, and then pulverizing the mixed and kneaded material into particles. More specifically, the black magnetic iron oxide particles and the binder resin are intimately mixed together with, if necessary, a mold release agent, a colorant, a charge-controlling agent or other additives by using a mixer. The obtained mixture is then melted and kneaded by a heating kneader so as to render the respective components compatible with each other, thereby dispersing the black magnetic iron oxide particles therein. Successively, the molten mixture is cooled and solidified to obtain a resin mixture. The obtained resin mixture is then pulverized and classified, thereby producing a magnetic toner having an aimed particle size.

As the mixers, there may be used a Henschel mixer, a ball mill or the like. As the heating kneaders, there may be used a roll mill, a kneader, a twin-screw extruder or the like. The pulverization of the resin mixture may be conducted by using pulverizers such as a cutter mill, a jet mill or the like. The classification of the pulverized particles may be conducted by known methods such as air classification, etc.

As the other method of producing the magnetic toner, there may be exemplified a suspension polymerization method or an emulsion polymerization method.

In the suspension polymerization method, polymerizable monomers and the black magnetic iron oxide particles are intimately mixed together with, if necessary, a colorant, a polymerization initiator, a cross-linking agent, a charge-controlling agent or the other additives and then the obtained mixture is dissolved and dispersed together so as to obtain a monomer composition. The obtained monomer composition is added to a water phase containing a suspension stabilizer while stirring, thereby granulating and polymerizing the composition to form magnetic toner particles having an aimed particle size.

In the emulsion polymerization method, the monomers and the black magnetic iron oxide particles are dispersed in water together with, if necessary, a colorant, a polymerization initiator or the like and then the obtained dispersion is polymerized while adding an emulsifier thereto, thereby producing magnetic toner particles having an aimed particle size.

Next, the process for producing the black magnetic iron oxide particles according to the present invention is described.

The black magnetic iron oxide particles of the present invention can be produced by various methods according to the aimed particle shape, particle diameter and content of different metal element.

That is, the black magnetic iron oxide particles of the present invention may be produced by:

(i) a method comprising the steps of:

reacting an aqueous ferrous salt solution, an aqueous alkali solution and an aqueous solution containing at least one different metal element other than Fe selected from the group consisting of Mn, Zn, Cu, Ni, Cr, Cd, Sn, Mg, Ti, Ca and Al in an amount of usually 0.1 to 10% by weight based on the weight of a final product, thereby producing ferrous hydroxide colloid containing the different metal element other than Fe;

passing an oxygen-containing gas through the ferrous salt reaction solution containing the thus obtained ferrous hydroxide colloid containing the different metal element other than Fe, thereby producing black spinel iron oxide particles containing the different metal element other than Fe as core particles;

adding an aqueous alkali solution to the ferrous salt reaction solution containing the obtained core particles together and residual $Fe^{2+}$ but containing substantially no different metal element;

passing an oxygen-containing gas through the mixed solution, thereby forming an intermediate layer composed of spinel iron oxide containing substantially no different metal element other than Fe, on the surface of the core particles;

further adding an aqueous solution containing the different metal element other than Fe in an amount of usually 0.1 to 10% by weight based on the weight of the final product, to the reaction solution containing the core particles coated with the intermediate layer together and residual $Fe^{2+}$; and passing an oxygen-containing gas through the reaction solution, thereby forming a surface coat portion composed of spinel iron oxide containing the different metal element other than Fe, on the surface of the intermediate layer, (ii) a method comprising the steps of:

reacting an aqueous ferrous salt solution, an aqueous alkali solution and an aqueous solution containing at least one different metal element other than Fe selected from the group consisting of Mn, Zn, Cu, Ni, Cr, Cd, Sn, Mg, Ti, Ca and Al in an amount of usually 0.1 to 10% by weight based on $Fe^{2+}$ contained in the aqueous ferrous salt solution, thereby producing ferrous hydroxide colloid containing the different metal element other than Fe;

passing an oxygen-containing gas through the ferrous salt reaction solution containing the thus obtained ferrous hydroxide colloid containing the different metal element other than Fe, thereby producing black spinel iron oxide particles containing the different metal element other than Fe as core particles;

adding an aqueous ferrous salt solution and an aqueous alkali solution to the reaction solution containing the obtained core particles;

passing an oxygen-containing gas through the reaction solution, thereby forming an intermediate layer composed of spinel iron oxide containing substantially no different metal element other than Fe, on the surface of the core particles;

adding an aqueous alkali solution together with the different metal element other than Fe in an amount of usually 0.1 to 10% by weight based on the weight of the final product, to the ferrous salt reaction solution containing the core particles coated with the intermediate layer; and passing an oxygen-containing gas through the reaction solution, thereby forming a surface coat portion composed of spinel iron oxide containing the different metal element other than Fe, on the surface of the intermediate layer, (iii) a method comprising the steps of:

reacting an aqueous ferrous salt solution, an aqueous alkali solution and an aqueous solution containing at least one different metal element other than Fe selected from the group consisting of Mn, Zn, Cu, Ni, Cr, Cd, Sn, Mg, Ti, Ca and Al in an amount of usually 0.1 to 20% by weight based on the weight of a final product, thereby producing ferrous hydroxide colloid containing the different metal element other than Fe;

passing an oxygen-containing gas through the ferrous salt reaction solution containing the thus obtained ferrous hydroxide colloid containing the different metal element other than Fe, thereby producing black spinel iron oxide particles containing the different metal element other than Fe as core particles;

adding an aqueous alkali solution to the ferrous salt reaction solution containing the obtained core particles;

passing an oxygen-containing gas through the reaction solution, thereby forming an intermediate layer composed of spinel iron oxide containing substantially no different metal element other than Fe, on the surface of the core particles;

further adding an aqueous ferrous salt solution and an aqueous alkali solution together with the different metal element other than Fe in an amount of usually 0.1 to 10% by weight based on the weight of the final product, to the reaction solution containing the core particles coated with the intermediate layer; and passing an oxygen-containing gas through the reaction solution, thereby forming a surface coat portion composed of spinel iron oxide containing the different metal element other than Fe, on the surface of the intermediate layer, and (iv) a method comprising the steps of:

reacting an aqueous ferrous salt solution, an aqueous alkali solution and an aqueous solution containing at least one different metal element other than Fe selected from the group consisting of Mn, Zn, Cu, Ni, Cr, Cd, Sn, Mg, Ti, Ca and Al in an amount of usually 0.1 to 10% by weight based on $Fe^{2+}$ contained in the aqueous ferrous salt solution, thereby producing ferrous hydroxide colloid containing the different metal element other than Fe;

passing an oxygen-containing gas through the ferrous salt reaction solution containing the thus obtained ferrous hydroxide colloid containing the different metal element other than Fe, thereby producing black spinel iron oxide particles containing the different metal element other than Fe as core particles;

adding an aqueous ferrous salt solution and an aqueous alkali solution to the reaction solution containing the obtained core particles;

passing an oxygen-containing gas through the reaction solution, thereby forming an intermediate layer composed of spinel iron oxide containing substantially no different metal element other than Fe, on the surface of the core particles;

adding an aqueous ferrous salt solution and an aqueous solution together with the different metal element other than Fe in an amount of 0.1 to 10% by weight based on the weight of the final product, to the reaction solution containing the core particles coated with the intermediate layer; and passing an oxygen-containing gas through the reaction solution, thereby forming a surface coat portion composed of spinel iron oxide containing the different metal element other than Fe, on the surface of the intermediate layer.

As the aqueous ferrous salt solution used in the present invention, there may be exemplified an aqueous ferrous sulfate solution, an aqueous ferrous chloride solution or the like.

As the aqueous alkali hydroxide solution used in the present invention, there may be exemplified an aqueous solution of alkali metal hydroxide such as sodium hydroxide and potassium hydroxide, an aqueous solution of alkali earth metal hydroxide such as magnesium hydroxide and calcium hydroxide, an aqueous solution of alkali carbonate such as sodium carbonate and potassium carbonate, ammonium carbonate, aqueous ammonia, or the like.

As the aqueous solution containing the different metal element other than Fe used in the present invention, there may be exemplified aqueous solutions containing carbonates, nitrates, chlorides, sulfates or the like of various metal elements. The aqueous solution containing the different metal element other than Fe may be added either at an initial stage of the reaction or during the reaction.

The aqueous alkali solution used in the production reaction of the core particles may be added in such an amount that the pH value of the reaction solution becomes optimum for the above-mentioned production methods and for obtaining the aimed particle shape. For example, when the aqueous alkali solution is added in an amount of 0.5 to 0.95 equivalent based on one equivalent of $Fe^{2+}$ contained in the aqueous ferrous salt solution, it is possible to produce spherical, hexahedral and polyhedral particles by adequately controlling the pH value of the reaction solution during the reaction. Also, when the aqueous alkali solution is added in an amount of more than one equivalent based on one equivalent of $Fe^{2+}$, it is possible to produce octahedral particles.

The oxidation reaction may be conducted by passing an oxygen-containing gas such as air through the solution.

The respective aqueous solutions are added, if required, to the reaction solution containing the thus produced core particles according to the above production methods, and then the mixed solution is subjected to oxidation reaction to form an intermediate layer composed of spinel iron oxide such as magnetite, on the surface of the core particles.

Further, by adequately controlling the pH value of the reaction upon formation of the intermediate layer, the spinel iron oxide can form a fine particles layer structure composed of agglomerated fine particles or may form a layer structure made from the fine particles. Namely, when the oxidation reaction is conducted by adjusting the pH value of the reaction solution to from 6.0 to less than 8.0, the resultant layer is in the form of a fine particle layer structure constituted from agglomerated fine particles. Also, when the oxidation reaction is conducted at a pH value of not less than 8.0, the resultant phase itself is in the form of a layer structure.

After completing the formation of the intermediate layer composed of spinel iron oxide containing substantially no different metal element other than Fe on the surface of the core particles, the respective aqueous solutions are added, if required, to the reaction solution containing the core particles coated with the intermediate layer, and then the mixed solution is subjected to oxidation reaction to form a surface coat portion composed of spinel iron oxide containing the different metal element other than Fe on the intermediate layer.

As the aqueous solution containing the different metal element used for forming the surface coat portion, there may be used the same aqueous solutions as exemplified above.

Further, by adequately controlling the pH value of the reaction solution upon formation of the surface coat portion, the resultant spinel iron oxide containing the different metal element other than Fe can form a fine particle layer structure composed of agglomerated fine particles or may form a layer structure made from the fine particles.

The reaction temperature used in the present invention is usually 70 to 100° C. When the reaction temperature is less than 70° C., acicular goethite particles may be disadvantageously mixed in the obtained particles. When the reaction temperature is more than 100° C., although black spinel iron oxide particles are produced, the production reaction under such a high temperature condition is disadvantageous from industrial viewpoint because the use of special apparatuses such as autoclave is required therefore.

After completing the reaction for forming the surface coat portion, the obtained particles are washed with water and then dried, thereby obtaining black magnetic iron oxide particles.

In the case where a silicon compound is incorporated into the black magnetic iron oxide particles, the silicon compound may be previously added to the reaction solution, or may be dropped or added in separate parts to the reaction solution during the oxidation reaction The amount of the silicon element added is preferably 0.05 to 5% by weight (calculated as $SiO_2$) based on the weight of the black magnetic iron oxide particles.

Examples of the silicon compound usable in the present invention may include water glass #3, sodium orthosilicate, sodium metasilicate, colloidal silica or the like.

Next, the method of treating the surface of the black magnetic iron oxide particles of the present invention is described.

(1) Coating of the Surface of Black Magnetic Iron Oxide Particles with an Organic Compound having a Hydrophobic Group The black magnetic iron oxide particles having coating layer comprising an organic compound having a hydrophobic group, are obtained by kneading black magnetic iron oxide particles to be treated with the organic compound having a hydrophobic group using a kneading-treatment apparatus having functions of compression, shearing and spatula-stroking such as a wheel-type kneader or an attrition mill, thereby coating the surface of each black magnetic iron oxide particle with the organic compound having a hydrophobic group.

As the wheel-type kneader used for the above purpose, there may be used Simpson mix muller, multimill, Stotz mill, back-flow kneader, Irich mill or the like. However, wet pan mill, melanger, whirl mixer and quick mill are inapplicable since these apparatuses perform no shearing work, but only compression and spatula-stroking.

The linear load used upon the kneading can be appropriately selected depending upon amount of the black magnetic iron oxide particles and kind and amount of the organic compound having a hydrophobic group. In the case where 10 kg of the black magnetic iron oxide particles are coated with the organic compound having a hydrophobic group, the linear load is preferably 30 to 120 kg/cm, more preferably 30 to 80 kg/cm, and the kneading time is preferably 30 to 90 minutes.

When the linear load is less than 30 kg/cm, it may be difficult to conduct a sufficient compression, shearing and spatula-stroking, thereby failing to obtain a uniform coating layer composed of the organic compound having a hydrophobic group. When the linear load is more than 120 kg/cm, the black magnetic iron oxide particles may be broken.

(2) Coating of the Surface of the Black Magnetic Iron Oxide Particle with Hydroxides and/or Oxides of Aluminum and/or Silicon The aluminum compound or the silicon compound is added to the suspension containing the black magnetic iron oxide particles to be treated, and then an aqueous alkali solution or an aqueous acid solution is added thereto to precipitate the hydroxides and/or oxides of aluminum and/or silicon on the surface of each black magnetic iron oxide particle.

As the aluminum compounds, there may be exemplified aluminum salts such as aluminum acetate, aluminum sulfate, aluminum chloride or aluminum nitrate, alkali aluminates such as sodium aluminate or the like.

As the silicon compounds, there may be exemplified #3 water glass, sodium orthosilicate, sodium metasilicate or the like.

It is preferred that the thus obtained black magnetic iron oxide particles onto which the hydroxides and/or oxides of aluminum and/or silicon is coated, are subjected to compression, shearing and spatula-stroking using a kneading-treatment apparatus such as a wheel-type kneader or an attrition mill.

(3) Adhesion of Fine Oxide Particles Composed of an Element Selected from the Group Consisting of Al, Si, Zr and Ti onto the Surface of the Black Magnetic Iron Oxide Particles The black magnetic iron oxide particles are kneaded with the fine oxide particles containing an element selected from the group consisting of Al, Si, Zr and Ti in an amount of usually 0.1 to 5% by weight based on the weight of the black magnetic iron oxide particles, using the above kneading apparatus having functions of compression, shearing and spatula-stroking, thereby coating the surface of the black magnetic iron oxide particles with the fine oxide particles containing an element selected from the group consisting of Al, Si, Zr and Ti.

The fine oxide particles may be directly added to the black magnetic iron oxide particles to be treated, prior to the kneading. Alternatively, after a specific compound is added to a suspension containing the black magnetic iron oxide particles, an aqueous alkali or acid solution may be added to the obtained suspension to precipitate the fine oxide particles.

The linear load used upon the kneading can be appropriately selected depending upon amount of the black magnetic iron oxide particles and kind and amount of the organic compound having a hydrophobic group. In the case where 10 kg of the black magnetic iron oxide particles are coated with the organic compound having a hydrophobic group, the linear load is preferably 30 to 120 kg/cm, more preferably 30 to 80 kg/cm, and the kneading time is preferably 30 to 90 minutes.

When the linear load is less than 30 kg/cm, it may be difficult to conduct a sufficient compression, shearing and spatula-stroking, thereby failing to obtain a uniform coating layer composed of the organic compound having a hydrophobic group. When the linear load is more than 120 kg/cm, the black magnetic iron oxide particles may be broken, thereby producing a powder component thereof.

(4) Adhesion of Fine Oxide Particles Obtained by Coating the Surface of the Fine Oxide Particles as Described in the Above (3) with at Least One Silane Compound Selected from the Group Consisting of Methylsilane, Trimethylsilane and Octylsilane, onto the Surface of the Black Iron Oxide Particles As the fine oxide particles coated with at least one silane compound selected from the group consisting of methylsilane, trimethylsilane and octylsilane, there may be used either commercially available products or fine particles obtained by kneading the fine oxide particles with the silane compound.

The thus silane-coated fine oxide particles may be coated onto the surface of the black magnetic iron oxide particles by the kneading method described in the above (3).

The point of the present invention is that the black magnetic iron oxide particles having a specific three-phase structure can exhibit not only excellent blackness and electrification property, but also an excellent environmental stability capable of maintaining a stable charge amount even under low-temperature and low-humidity conditions or high-temperature and high-humidity conditions.

The reason why the black magnetic iron oxide particles of the present invention can exhibit excellent blackness, electrification property and environmental stability is considered as follows, though not apparently determined. That is, it is considered that by forming the intermediate layer composed of spinel iron oxide containing no different metal element other than Fe between the core portion and the surface coat portion both composed of spinel iron oxide containing the different metal element usually having a high electrical resistance, the respective portions can be effectively interacted with each other.

Since the black magnetic iron oxide particles of the present invention have not only excellent blackness and electrification property, especially excellent electrification build-up performance, but also an excellent environmental stability, the magnetic toner produced from the black magnetic iron oxide particles can also exhibit excellent electrification property and environmental stability.

The black magnetic iron oxide particles of the present invention have a high blackness and an excellent electrification property and are capable of maintaining a stable charge amount due to a rapid build-up of electrification, and, therefore, are suitable as black magnetic particles.

The magnetic toner produced from the black magnetic iron oxide particles according to the present invention can exhibit excellent electrification property and are capable of maintaining a stable charge amount even under low-temperature and low-humidity conditions or high-temperature and high-humidity conditions, and, therefore, are suitable as magnetic toner.

EXAMPLES

The present invention is described in more detail by Examples and Comparative Examples, but the Examples are only illustrative and, therefore, not intended to limit the scope of the present invention.

Various properties were evaluated by the following methods.

(1) The average particle diameter of the black magnetic iron oxide particles or the magnetic particles is expressed by the average value of Marcin diameters of 300 particles appearing on the photo (magnification: ×40,000) obtained by magnifying the transmission electron micrograph (magnification: ×10,000) four times.

(2) The shape of the black magnetic iron oxide particles as well as layer structures of the intermediate layer and the surface coat portion thereof were determined by observing particles appearing on an electron micrograph (magnification: ×50,000) obtained by a transmission electron microscope and a scanning electron microscope ("S-800" manufactured by Hitachi Limited). The layer structure of the intermediate layer was determined by observing the particles obtained by subjecting a slurry sampled after formation of the intermediate layer, to washing with water, filtering-out and then drying.

(3) The BET specific surface area value of the black magnetic iron oxide particles or the magnetic particles was measured by a BET method using "Mono Sorb MS-II" (manufactured by Yuasa Ionics Co., Ltd.).

(4) The magnetic properties of the black magnetic iron oxide particles or the magnetic particles were measured under an external magnetic field of not more than 796 kA/m by using a vibration sample magnetometer "VSM-3S-15" (manufactured by Toei Kogyo Co., Ltd.).

(5) The $Fe^{2+}$ content is expressed by the value measured by the following chemical analysis method.

That is, 0.5 g of the black magnetic iron oxide particles were mixed and dissolved in 25 cc of a mixed solution containing phosphoric acid and sulfuric acid at a weight ratio of 2:1, under an inert gas atmosphere. The obtained solution was diluted, and then several droplets of diphenylamine sulfonic acid as indicator were added into the diluted solution. Thereafter, the solution was subjected to oxidation-reduction titration using an aqueous potassium bichromate solution. At the time at which the diluted solution exhibited violet color, the titration was terminated to measure the amount of the aqueous potassium bichromate solution used during the titration. The $Fe^{2+}$ content was calculated from the measured value.

(6) The portions where the different metal element was present and the contents of the different metal element at the respective portions were determined as follows. That is, the black magnetic iron oxide particles were successively dissolved in the order of the surface coat portion, intermediate layer and core portion thereof, from the surface of the respective particles, thereby measuring the amounts of the different metal element contained in the dissolution solution. Then, the relationship between the Fe dissolution percentages and the amounts of the different metal element contained in the respective dissolution solutions at respective Fe dissolution percentages was determined by plotting the measured values as shown in the attached figures. More specifically, the amounts of Fe and the different metal element contained in the respective solutions sampled were measured simultaneously, thereby obtaining an integrated value of the content of the different metal element at each Fe dissolution percentage. The content of the different metal element was calculated from the integrated value. The calculated values of the content of the different metal element were plotted relative to the respective Fe dissolution percentages. As a result, it was confirmed that the intermediate layer contained no element other than Fe.

Meanwhile, the black magnetic iron oxide particles were dissolved by the following method.

That is, 1.2 liters of ion-exchanged water was charged into a 2-liter beaker, and heated to 45° C. Into the 2-liter beaker, a slurry obtained by dispersing 10 g of the black magnetic iron oxide particles in 160 ml of ion-exchanged water was added, while washing with 320 ml of separately prepared ion-exchanged water, together with the washing ion-exchanged water.

Then, 150 ml of guaranteed hydrochloric acid was added to the 2-liter beaker while maintaining the temperature of the solution in the beaker at 40° C. and stirring at 200 rpm, thereby initiating dissolution of the particles. Upon initiation of the dissolution, the concentration of the black magnetic iron oxide particle was 5 g/liter, and the hydrochloric acid concentration was about 1N.

During the period from the initiation of dissolution of the black magnetic iron oxide particles up to the time at which the solution became transparent, 20 ml of the obtained solution was sampled at intervals of 1 to 10 minutes, and filtered through a 0.1 μm membrane filter, thereby sampling a filtrate.

10 ml of the thus sampled filtrate was subjected to quantitative analysis using an inductively coupled plasma atomic emission spectrometer "SPS-4000 Model " (manufactured by Seiko Denshi Kogyo, Co., Ltd.) to determine amounts of Fe and the different metal element contained therein.

The Fe dissolution percentage of the black magnetic iron oxide particles was calculated from the following formula:

Fe dissolution percentage (%)=(Fe concentration of sampled solution (mg/liter)/(Fe concentration of sampled solution in which particles were completely dissolved (mg/liter))×100

Also, from the graph prepared by plotting the contents of the different metal element relative to Fe dissolution percentages, the particle portion where the intermediate layer was present was determined. The particle portion of the second phase was expressed by Fe dissolution percentage (%) range in which no different metal element other than Fe was dissolved, and the Fe dissolution percentage on the side of core portion was designated by t1 and the Fe dissolution percentage on the side of surface coat portion was designated by t2.

(7) The electrification saturation time of the black magnetic iron oxide particles was measured by the following method.

That is, 0.5 g of magnetic iron oxide particles and 4.75 g of iron powder carrier (tradename: TEFV-200/300, produced by Powdertec Co., Ltd.) were precisely weighed and charged into a sampling glass bottle having an inner volume of 15 cc, and frictionally electrified using a paint conditioner. The frictional charge amount of the particles was measured using "Blow-Off Charge Amount Measuring Device" (manufactured by Toshiba Chemical Co., Ltd.). The charge amount of the particles relative to the time required for the frictional electrification using the paint conditioner, were plotted on a graph to determine an electrification saturation time at which the charge amount was stabilized.

The shorter the electrification saturation time, the more excellent the electrification property of a magnetic toner produced from the magnetic iron oxide particles, especially the more the build-up of electrification can be improved.

(8) The electrification stability was measured by the following method.

That is, the sample was allowed to stand for 24 hours at a temperature of 23° C. and a humidity of 60% (under N/N environmental conditions), at a temperature of 15° C. and a humidity of 20% (under L/L environmental conditions), and at a temperature of 33° C. and a humidity of 80% (under H/H environmental conditions) to measure charge amounts Q of the sample under the respective conditions. The change rates of the charge amounts Q under the L/L environmental conditions and under the H/H environmental conditions relative to the charge amount under the N/N environmental conditions, were respectively calculated from the following formulae:

$$\text{Changing Percentage}(\%) = \frac{|Q(L/L)| - |Q(N/N)|}{|Q(N/N)|} \times 100$$

$$\text{Changing Percentage}(\%) = \frac{|Q(N/N)| - |Q(H/H)|}{|Q(N/N)|} \times 100$$

The electrification stability was evaluated by classifying the calculation results into the following four ranks.

A: Both change rates of charge amounts under L/L and H/H conditions were less than 5%;

B. One of change rates of charge amounts under L/L and H/H conditions was 5 to 10%, and the other was less than 5%;

C: Both change rates were 5 to 10%; and

D; Either one of change rates was not less than 10%.

(9) The electrical resistance of the black magnetic iron oxide particles was measured by the following method.

That is, 0.5 g of a sample was weighed, and pressure-molded under a pressure of 140 $Kg/cm^2$ as a gauge value read at a hand-press "SSP-10 Model" (manufactured by SHIMADZU SEISAKUSHO CO., LTD.) using a KBr tablet machine (manufactured by SHIMADZU SEISAKUSHO CO., LTD.). The thus-molded sample was then set between stainless steel electrodes, whereupon the space between the electrodes was completely isolated from outside by Teflon holder. A voltage of 15V was applied to the sample using a Wheatstone bridge ("TYPE2768 Model", manufactured by YOKOGAWA DENKI CO., LTD.), thereby measuring an electrical resistance value R of the sample. Then, an electrode surface area A ($cm^2$) and a thickness t (cm) of the sample were measured. On the basis of the measured values, the volume resistivity value X (Ω·cm) of the sample was calculated from following formula:

$$X=R/(A/t)$$

The results were classified into the following three ranks.

A: not less than $1\times10^7$ Ω·cm;

B: $1\times10^6$ to $1\times10^7$ Ω·cm; and

C: less than $1\times10^6$ Ω·cm.

(10) The blackness (a* value) of the black magnetic iron oxide particles is expressed by the value obtained by measuring L*, a* and b* values of each sample in the "Lab" space of Hunter using a "Multi-Spectro-Colour-Meter MSC-IS-2D" (manufactured by Suga Testing Machines Manufacturing Co., Ltd.) according to (L*, a* and b*) uniform sensory color space of Commission Internationale de l'Eclairage CIE (1976). The closer to zero the a* value, the more excellent the blackness of the black magnetic iron oxide particles.

(11) The amount of silicon contained in the black magnetic iron oxide particles was measured by a "Fluorescent X-ray Analyzer 3063 M Model" (manufactured by Rigaku Denki Kogyo Co., Ltd.), and expressed by the amount (calculated as $SiO_2$) based on the weight of the black magnetic iron oxide particles.

(12) The liquid absorption of the black magnetic iron oxide particles according to the present invention as one of indices of dispersibility thereof was measured by the following method.

That is, the liquid absorption is expressed as the amount of a styrene-acrylic resin solution absorbed into 10 g of the black magnetic iron oxide particles.

(i) A styrene-acrylic resin (tradename: "HIGHMER-TB-1000", produced by Sanyo Kasei Co., Ltd.) and xylene were precisely weighed and charged into a 500-ml polyester container with a top lid such that the resin content was 20% by weight. The mixture was blended together by a paint conditioner to prepare a resin solution.

(ii) 10 g of the black magnetic iron oxide particles were weighed by an electronic balance and charged into a 100-ml polyester container. Then, the previously prepared resin solution was dropped into the 100-ml container through a burette while stirring the resultant mixture by a glass rod.

(iii) The dropping of the resin solution was terminated when the mixture (paste) in the polyester container became homogeneous and exhibited a high flowability, and was first dropped by gravity from the tip end of the glass rod.

(iv) The amount of the resin solution used until reaching the terminal point was determined as the liquid absorption of the black magnetic iron oxide particles.

The lower the liquid absorption of the black magnetic iron oxide particles, the higher the dispersibility of the black magnetic iron oxide particles in resins and, therefore, the higher the charging capacity of the magnetic toner.

(13) The gloss of the resin sheet as one of indices of dispersibility of the black magnetic iron oxide particles according to the present invention was measured by the following method.

That is, 15 g of the black magnetic iron oxide particles, 34 g of a styrene-acrylic resin which was previously dried at 60° C. for 8 hours (tradename: "HIGHMER TB-9000", produced by Sanyo Kasei Co., Ltd.) and 1 g of a polypropylene resin as a mold release agent (tradename: "BISCOL 550P", produced by Sanyo Kasei Co., Ltd.) were kneaded together using a twin hot roll having a surface temperature of 130° C., thereby obtaining a kneaded material. The obtained kneaded material was then molded into a sheet using a hot press, thereby producing a sheet-like resin kneaded material. The gloss of a resin film surface of the sheet-like kneaded material was measured at incident and reflection angles of 200 using a digital gloss meter ("UGV-50", manufactured by Suga Testing Machines Manufacturing Co., Ltd.). The larger the gloss value, the higher the dispersibility of the black magnetic iron oxide particles in resins.

(14) The amount of an aluminum compound and silicon compound coated on the surfaces of the black magnetic iron oxide particles was measured by a "Fluorescent X-ray Analyzer 3063 M type" (manufactured by Rigaku Denki Kogyo Co., Ltd.), and expressed by the amount (calculated as Al and $SiO_2$) based on the weight of the black magnetic iron oxide particles.

(15) The amount of fine particles of oxides of at least one element selected from the group consisting of Al, Si, Zr and Ti which were adhered or deposited on the surface of each black magnetic iron oxide particle, was measured by a "Fluorescent X-ray Analyzer 3063 M type" (manufactured by Rigaku Denki Kogyo Co., Ltd.), and expressed by the amount (calculated as an oxide of each element) based on the weight of the black magnetic iron oxide particles.

(16) The compression (compaction) degree of the black magnetic iron oxide particles is expressed by the value obtained by measuring a bulk density (ρa) and a tap density (ρt) thereof and substituting the measured values for ρa and ρt of the following formula:

$$\text{Compression degree}=[(\rho t-\rho a)/\rho t]\times100$$

The smaller the compression degree, the more excellent the fluidity of the black magnetic iron oxide particles.

Meanwhile, the bulk density (ρa) was measured by the pigment testing method according to JIS-5101. The tap density (ρt) was determined as follows. That is, 10 g of the magnetic iron oxide particles used for measurement of the bulk density were slowly filled into a 200 cc measuring cylinder through a funnel, and then dropped by gravity from a height of 25 mm. After the above procedure was repeated 600 times, the volume (cc) of the magnetic iron oxide particles filled in the measuring cylinder was read from a scale of the measuring cylinder. On the basis of the measured value, the tap density was calculated from the following formula:

Tap density (g/cc)=10 (g)/volume (cc)

(17) The oil absorption of the black magnetic iron oxide particles was measured by the pigment testing method according to JIS-K-5101.

(18) The electrification saturation time of the magnetic toner produced from the black magnetic iron oxide particles was measured by the following method.

Magnetic Toner Production Method

The following components were blended together at a mixing ratio as shown below. The obtained mixture was kneaded for about 15 minutes using a twin-roll mill maintained at 140° C. After cooling, the obtained kneaded material was coarsely crushed and then finely pulverized. The obtained particles were further classified to remove fine particles and coarse particles therefrom, thereby obtaining a magnetic toner having a volume-average particle diameter of 10.4 μm.

| Composition of magnetic toner | |
|---|---|
| Styrene-n-butyl acrylate copolymer (copolymerization ratio: 85:15; Mw: 250,000; Tg: 62° C.) | 100 parts by weight |
| Black magnetic iron oxide particles | 80 parts by weight |
| Negative charge controller | 1.5 parts by weight |
| Low-molecular ethylene-propylene copolymer | 2 parts by weight |

The one-component developer prepared from the thus obtained magnetic toner was allowed to stand for 24 hours at temperature of 23° C. and a humidity of 60% (under N/N environmental conditions), at temperature of 15° C. and a humidity of 20% (under L/L environmental conditions) and at temperature of 33° C. and a humidity of 80% (under H/H environmental conditions), respectively, to measure the respective charge amounts Q. The change rates of the charge amounts Q under the L/L environmental conditions and under the H/H environmental conditions relative to the charge amount under the N/N environmental conditions, were respectively calculated from the following formulae:

$$\text{Changing Percentage}(\%) = \frac{|Q(L/L)| - |Q(N/N)|}{|Q(N/N)|} \times 100$$

$$\text{Changing Percentage}(\%) = \frac{|Q(N/N)| - |Q(H/H)|}{|Q(N/N)|} \times 100$$

The electrification stability was evaluated by classifying the above results into the following four ranks A: Both change rates of charge amounts under L/L and H/H conditions were less than 5%;

B: One of change rates of charge amounts under L/L and H/H conditions was 5 to 10%, and the other was less than 5%;

C: Both change rates were 5 to 10%; and

D: Either one of change rates was not less than 10%.

(19) The image density of the magnetic toner produced from the black magnetic iron oxide particles allowed to stand under the L/L and H/H environmental conditions was determined by printing solid black on a paper (A4) using a laser beam printer (tradename: "LASER SHOT LBP-B406E", manufactured by Canon Co., Ltd.) and measuring a density of the solid black printed by "RD914" (tradename, manufactured by MACBETH Co., Ltd.).

The image density of the magnetic toner subjected to durability test under high-temperature and high-humidity conditions was determined as follows. That is, images were repeatedly printed on 5,000 sheets using the magnetic toner produced from the black magnetic iron oxide particles allowed to stand under the high-temperature and high-humidity conditions. The toner density of images printed on the 5,000th sheet was measured, and the image density of the magnetic toner was expressed by the measured value.

The results were classified into the following four ranks.

A: Image density of not less than 1.4;

B; image density of from 1.3 to less than 1.4;

C: Image density of from 1.2 to less than 1.3; and

D: Image density of less than 1.2.

(20) The obtained magnetic toner was sliced using an ultra-microtome (tradename: "MT2C", manufactured by Research Manufacturing Co., Ltd.), and the sliced section thereof was observed by a transmission electron microscope (magnification: ×10,000) to examine agglomeration of the magnetic iron oxide particles in a visual field The observation results were classified into the following four ranks to evaluate the dispersibility of the magnetic iron oxide particles.

Dispersibility

A: 0 to 1 agglomerated particles;

B: 2 to 5 agglomerated particles;

C: 6 to 10 agglomerated particles; and

D: not less than 11 agglomerated particles.

(21) The distribution of charge amount of the magnetic toner was measured using a charge amount distribution measuring device "E-Eastper-Analyzer" (manufactured by Hosokawa Micron Co., Ltd.). The obtained charge amount distribution was compared with the charge amount distribution (B) of the magnetic toner obtained in Example 1 as a reference. The charge amount distribution sharper (narrower) than the reference distribution (B) was assigned Rank A.

(22) The degree of fogging of the magnetic toner was determined by observing an enlarged image of printed solid black used for the measurement of image density, using a loupe. The observation results were compared with the fogging degree (B) of the magnetic toner obtained in Example 1 as a reference. The fogging degree sharper (less) than the reference fogging degree (B) was assigned Rank A.

(23) The fluidity index of the magnetic toner was measured by a "Powder Tester PT-E type" (manufactured by Hosokawa Micron Co., Ltd.). The higher the fluidity index, the more excellent the fluidity of the magnetic toner. In addition, the fluidity of the magnetic toner allowed to stand for 24 hours under high-temperature and high-humidity conditions, i.e., at a temperature of 33° C. and a humidity of 80%, was measured by the same method as described above.

Example 1

Production of Black Magnetic Iron Oxide Particles (Method (i))

26.0 liters of an aqueous ferrous sulfate solution containing $Fe^{2+}$ in an amount of 1.6 mol/liter and 6.2 liters of an aqueous manganese sulfate solution containing Mn in an amount of 0.584 mol were charged into a reactor previously filled with 20.1 liters of a 4.0 mol/liter aqueous sodium hydroxide solution (sum of 0.95 equivalent based on $Fe^{2+}$ and amount required for forming a precipitate of Mn). Then, air was passed through the obtained solution at a feed rate of 80 liters/minute while maintaining the solution at a pH value of 6.7 and a temperature of 90° C. to conduct oxidation reaction, thereby obtaining spherical core particles. Meanwhile, sodium silicate was added in an amount of 1.0% by weight (calculated as $SiO_2$) based on the weight of the final product, to the aqueous sodium hydroxide solution.

Upon completion of the oxidation reaction for production of the core particles (i.e., at the time at which the decrease in pH value of the reaction slurry was initiated as a result of consumption of sodium hydroxide due to the oxidation reaction), 2.37 liters of an additional aqueous sodium hydroxide solution (4.0 mol/liter) was added to the reactor in order to neutralize residual $Fe^{2+}$ remaining in the reactor and then adjust the pH value of the reaction solution to 9. Then, the oxidation reaction was further continued, thereby forming an intermediate layer on the respective core particles.

In the course of the oxidation reaction, 2.5 liter of an aqueous manganese sulfate solution containing Mn in an amount of 0.0584 mol/liter was added to the reaction solution, and the oxidation reaction was further continued while maintaining the pH value of the reaction solution at 9, thereby forming a surface coat portion containing Si and Mn on the intermediate layer. Then, the oxidation reaction was terminated. It was confirmed that the pH value of the reaction solution upon termination of the oxidation reaction was 9.

The slurry containing the thus obtained black magnetic iron oxide particles was washed with water, filtered out, dried and then pulverized, thereby obtaining black magnetic iron oxide particles.

Figure 1B:
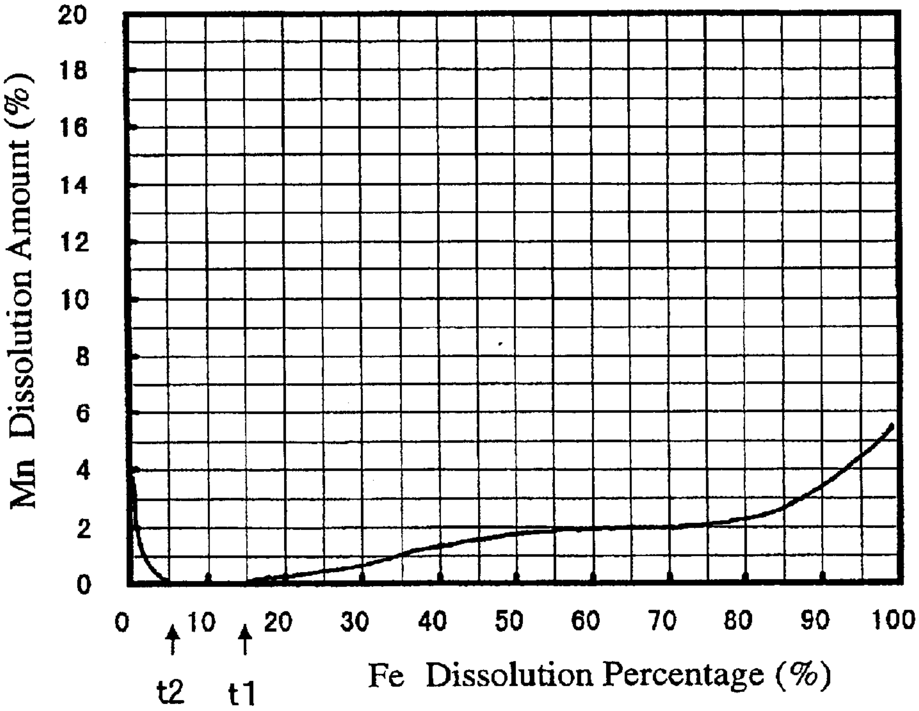

The distribution of content of the element other than Fe contained in the obtained black magnetic iron oxide particles based on each point of the Fe dissolution percentage thereof are shown in FIGS. 1A and 1B. As apparent from FIGS. 1A and 1B, Mn was dissolved when the Fe dissolution percentage was in the range of 0% to 5% (surface coat portion); Mn was not dissolved when the Fe dissolution percentage was in the range of 5% to 15% (intermediate layer); and Mn was dissolved when the Fe dissolution percentage was in the range of 15% to 100% (core portion). Namely, it was confirmed that the core portion closer to center of the respective particles and the surface coat portion located outside contained Mn; and the intermediate layer interposed therebetween contained no Mn.

As a result of observation by an electron microscope, it was confirmed that the obtained particles were of a spherical shape having a particle diameter of 0.20 μm. Further, the particles obtained after forming the intermediate layer and the particles obtained after forming the surface coat portion were respectively observed by a transmission electron microscope. As a result of the observation, it was confirmed that the surface of the respective particles was free from any irregularities and, therefore, smooth. As a result, it was confirmed that both the intermediate and surface coat portions had a layer structure.

The thus obtained black magnetic iron oxide particles had a BET specific surface area value of 7.5 $m^2/g$; saturation magnetization σr of 82.5 $Am^2/g$; a Si content of 1.0% by weight; a FeO content of 20.4% by weight; an a* value of 0.5; a charge amount of −18 μC/g; and an electrification saturation time of 5 minutes. The electrical resistance of the obtained black magnetic iron oxide particles was Rank A, and the change rate of charge amount thereof was Rank A.

Use Example 1

Production of Magnetic Toner

The magnetic toner was produced from the obtained black magnetic iron oxide particles by the above-described Magnetic Toner Production Method. The thus obtained magnetic toner was exposed to the L/L and H/H environmental conditions to measure respective charge amounts thereof. As a result, it was confirmed that there was no significant difference between the charge amounts under the L/L and H/H environmental conditions (Rank A as evaluated by the above method); and the image densities of the magnetic toner under the L/L and H/H environmental conditions both were Rank A. Therefore, it was recognized that the obtained magnetic toner had a high environmental stability.

Examples 2, 4, 5 and 12 and Comparative Example 5

The same procedure as defined in Example 1 was conducted except that the production conditions were changed variously, thereby obtaining black magnetic iron oxide particles.

Main production conditions are shown in Table 1, and various properties of the obtained black magnetic iron oxide particles are shown in Tables 2 and 3.

Example 3

Production of Black Magnetic Iron Oxide Particles (Method (ii))

20.0 liters of an aqueous ferrous sulfate solution containing $Fe^{2+}$ in an amount of 1.6 mol/liter and 4.7 liters of an aqueous manganese sulfate solution containing Mn in an amount of 0.271 mol were charged into a reactor previously filled with 15.3 liters of a 4.0 mol/liter aqueous sodium hydroxide solution (sum of 0.95 equivalent based on $Fe^{2+}$ and amount required for forming a precipitate of Mn). Then, air was passed through the obtained solution at a feed rate of 80 liters/minute while maintaining the solution at a pH value of 6.7 and a temperature of 90° C., thereby obtaining spherical core particles. At the time at which the decrease in pH value of the reaction slurry due to residual ferrous sulfate was initiated, 4.0 liters of an additional aqueous ferrous sulfate solution (1.6 mol/liter) was added to the residual $Fe^{2+}$ in the reactor, and an aqueous sodium hydroxide solution was further added thereto so as to adjust the pH value of the reaction solution to not less than 8. Meanwhile, sodium silicate was added in an amount of 1.5% by weight (calculated as $SiO_2$) based on the weight of the final product, to the aqueous sodium hydroxide solution. Then, the oxidation reaction was further continued, thereby forming an intermediate layer on the respective core particles. At the time at which about one half of the residual $Fe^{2+}$ was oxidized, an aqueous copper sulfate solution containing Cu in an amount of 0.097 mol was added to the reaction solution, and the oxidation reaction was further continued while maintaining the pH value of the reaction solution at 6.5 to 8.5, thereby forming a surface coat portion containing Si and Cu on the intermediate layer. The solution containing the thus formed magnetic iron oxide particles was washed with water and then dried by ordinary methods, thereby obtaining black magnetic iron oxide particles.

As a result of measuring contents of elements other than Fe contained in the obtained black magnetic iron oxide particles at the respective Fe dissolution percentages, it was confirmed that Cu was dissolved when the Fe dissolution percentage was in the range of 0% to 40% (surface coat portion), Mn and Cu were not dissolved when the Fe dissolution percentage was in the range of 40% to 50% (intermediate layer); and Mn was dissolved when the Fe dissolution percentage was in the range of 50% to 100% (core portion). Namely, it was confirmed that the core portion closer to center of the respective particles contained Mn; the surface coat portion contained Cu; and the intermediate layer interposed therebetween contained no Mn nor Cu.

It was confirmed that the obtained particles were spherical particles having a particle diameter of 0.06 μm. Further, as a result of observation of the particles obtained after forming the intermediate layer and the particles obtained after forming the surface coat portion by a transmission electron microscope, the surface of the particles after forming the intermediate layer was smooth without irregularities; and the particles obtained after forming the surface coat portion had irregularities on the surface thereof. Therefore, it was confirmed that the intermediate layer had a simple layer structure, and the surface coat portion had a fine particle layer structure composed of agglomerated fine particles.

Main production conditions are shown in Table 1, and various properties of the obtained black magnetic iron oxide particles are shown in Tables 2 and 3.

Examples 9 and 13 and Comparative Examples 1 and 2

The same procedure as defined in Example 3 was conducted except that the production conditions were changed variously, thereby obtaining black magnetic iron oxide particles.

Main production conditions are shown in Table 1, and various properties of the obtained black magnetic iron oxide particles are shown in Tables 2 and 3.

Example 6

Production of Black Magnetic Iron Oxide Particles (Method (iii))

20.0 liters of an aqueous ferrous sulfate solution containing $Fe^{2+}$ in an amount of 1.6 mol/liter and 4.8 liters of an aqueous zinc sulfate solution containing Zn in an amount of 0.068 mol were charged into a reactor previously filled with 15.2 liters of a 4.0 mol/liter aqueous sodium hydroxide solution (sum of 0.95 equivalent based on $Fe^{2+}$ and amount required for forming a precipitate of Zn). Then, air was passed through the obtained solution at a feed rate of 80 liters/minute while maintaining at a temperature of 90° C. to initiate an oxidation reaction thereof. The pH value of the reaction solution immediately after the initiation of the oxidation reaction was adjusted to 8.9, and the oxidation reaction was continued, thereby obtaining hexahedral core particles. Upon completion of the oxidation reaction for production of the core particles (i.e., at the time at which the decrease in pH value of the reaction slurry was initiated as a result of consumption of sodium hydroxide due to the oxidation reaction), whole amount of Zn was incorporated into the iron oxide core particles, and $Fe^{2+}$ (about 1.6 mol) remained in the reaction solution. An aqueous sodium hydroxide solution (4.0 mol/liter) was added in an equivalent amount based on the residual $Fe^{2+}$ to the reaction solution. Meanwhile, sodium silicate was added in an amount of 0.5% by weight (calculated as $SiO_2$) based on the weight of the final product, to the aqueous sodium hydroxide solution. The oxidation reaction was further continued while adjusting the pH value of the reaction solution to 9, thereby forming an intermediate magnetite layer on the surface of the respective core particles, whereupon the oxidation reaction was terminated. Then, an aqueous ferrous sulfate solution (4.0 liters of an aqueous ferrous sulfate solution containing $Fe^{2+}$ in an amount of 1.6 mol/liter) and an aqueous sodium hydroxide solution (in an equivalent amount based on $Fe^{2+}$ contained in the aqueous ferrous sulfate solution) were added into the reaction solution containing the iron oxide particles coated with the intermediate layer, and the oxidation reaction was further conducted while maintaining the pH value of the reaction solution to 7. In the course of the oxidation reaction, 1.9 liters of an aqueous zinc sulfate solution containing Zn in an amount of 0.117 mol was added to the reaction solution, and the oxidation reaction was further continued and terminated. The pH value of the reaction solution upon termination of the oxidation reaction was 7. The reaction solution containing the thus obtained magnetic iron oxide particles was successively washed with water, filtered out, dried and then pulverized by ordinary methods, thereby obtaining black magnetic iron oxide particles containing Si and Zn.

The obtained black magnetic iron oxide particles were hexahedral particles having a particle diameter of 0.24 μm. It was confirmed that the intermediate layer was present in a region where the Fe dissolution percentage as measured from the surface of the respective particles was in the range of 10 to 20%; the amount of Zn contained in the core portion was 0.15% by weight based on whole particle; and the amount of Zn contained in the surface coat portion was 0.25% by weight based on whole particle.

Main production conditions are shown in Table 1, and various properties of the obtained black magnetic iron oxide particles are shown in Tables 2 and 3.

Example 11 and Comparative Examples 3 and 7

The same procedure as defined in Example 6 was conducted except that the production conditions were changed variously, thereby obtaining black magnetic iron oxide particles.

Main production conditions are shown in Table 1, and various properties of the obtained black magnetic iron oxide particles are shown in Tables 2 and 3.

Example 7

Production of Black Magnetic Iron Oxide Particles (Method (iv))

20.0 liters of an aqueous ferrous sulfate solution containing $Fe^{2+}$ in an amount of 1.6 mol/liter and 3.7 liters of an aqueous zinc sulfate solution containing Zn in an amount of 2.254 mol were charged into a reactor previously filled with 16.3 liters of a 4.0 mol/liter aqueous sodium hydroxide solution (sum of 0.95 equivalent based on $Fe^{2+}$ and amount required for forming a precipitate of Zn). Then, air was passed through the obtained solution at a feed rate of 80 liters/minute while maintaining the solution at a temperature of 90° C. to conduct an oxidation reaction thereof, thereby obtaining spherical core particles. Upon completion of the oxidation reaction for production of the core particles (i.e., at the time at which the decrease in pH value of the reaction slurry was initiated as a result of consumption of sodium hydroxide due to the oxidation reaction), whole amount of Zn was incorporated into the iron oxide core particles, and $Fe^{2+}$ (about 1.6 mol) remained in the reaction solution within the reactor. 1.5 liters of an additional aqueous ferrous sulfate solution (containing $Fe^{2+}$ in an amount of 1.6 mol/liter) was added to the reaction solution to adjust the amount of $Fe^{2+}$ contained in the reaction solution to 4 mol. Then, an aqueous sodium hydroxide solution was added in an equivalent amount based on the $Fe^{2+}$ contained in the reaction solution. Meanwhile, sodium silicate was added in an amount of 2.0% by weight (calculated as $SiO_2$) based on the weight of the final product, to the aqueous sodium hydroxide solution. The oxidation reaction was further continued while adjusting the pH value of the reaction solution to 9, thereby forming an intermediate layer containing no different metal element other than Fe, on the surface of the respective core particles. Then, an additional aqueous ferrous sulfate solution (5.63 liters of an aqueous ferrous sulfate solution containing $Fe^{2+}$ in an amount of 1.6 mol/liter), an aqueous sodium hydroxide solution of 4.0 mol/liter (in an equivalent amount based on $Fe^{2+}$ contained in the aqueous ferrous sulfate solution) and 2.8 liters of an aqueous zinc sulfate solution containing Zn in an amount of 1.127 mol were added into the reaction solution containing the iron oxide particles coated with the intermediate layer, and the oxidation reaction was further conducted while maintaining the pH value of the reaction solution to 9, thereby forming a surface coat portion containing Si and Zn on the surface of the intermediate layer. The pH value of the reaction solution upon termination of the oxidation reaction was 9. The reaction solution containing the thus obtained magnetic iron oxide particles was successively washed with water, filtered out, dried and then pulverized by ordinary methods, thereby obtaining black magnetic iron oxide particles.

The obtained black magnetic iron oxide particles were spherical particles having a particle diameter of 0.10 $\mu$m. It was confirmed that the intermediate layer was present in a region where the Fe dissolution percentage as measured from the surface of the respective particles was in the range of 20 to 28%; the amount of Zn contained in the core portion was 4.0% by weight based on whole particle; and the amount of Zn contained in the surface coat portion was 2.0% by weight based on whole particle.

Main production conditions are shown in Table 1, and various properties of the obtained black magnetic iron oxide particles are shown in Tables 2 and 3.

Examples 8, 10 and 14 and Comparative Examples 4 and 6

The same procedure as defined in Example 7 was conducted except that the production conditions were changed variously, thereby obtaining black magnetic iron oxide particles.

Main production conditions are shown in Table 1, and various properties of the obtained black magnetic iron oxide particles are shown in Tables 2 and 3.

Example 15

10 kg of the black magnetic iron oxide particles obtained in Example 1 and 100 g of γ-glycidoxypropyltrimethoxysilane ("A-187", produced by Nippon Uniker Co., Ltd.; 1.0 part by weight based on 100 parts by weight of the black magnetic iron oxide particles) were charged into a Simpson mix muller "Sand Mill MPUV-2" (manufactured by Matsumoto Chuzo Tekkosho Co., Ltd.), and mixed at a linear load of 30 kg/cm for 60 minutes, thereby coating the surface of the black magnetic iron oxide particles with the organic compound having a hydrophobic group.

The thus obtained black magnetic iron oxide particles had an average particle diameter of 0.24 $\mu$m; a BET specific surface area value of 7.0 $m^2/g$; a saturation magnetization value of 81.6 $Am^2/kg$; a blackness (a* value) of +0.4; an electrification saturation time of 3 minutes; an liquid absorption of 7.2 ml/100 g; and a 20° C. gloss of 94.0% as measured on a surface of a resin film composed of a styrene-acrylic resin kneaded material.

Main production conditions are shown in Table 5, and various properties of the obtained black magnetic iron oxide particles are shown in Table 6.

Examples 16 to 18

The same procedure as defined in Example 15 was conducted except that the surface-treating conditions were changed variously, thereby obtaining black magnetic iron oxide particles.

Main production conditions are shown in Table 5, and various properties of the obtained black magnetic iron oxide particles are shown in Table 6. The shape, average particle diameter and FeO content of the obtained black magnetic iron oxide particles were substantially the same as those of Example 1.

Example 19

While stirring a water suspension containing 1 kg of the black magnetic iron oxide particles obtained in Example 1 at a pH value of 10 to 11 and a temperature of 80° C., water glass #3 was dropped thereinto in an amount of 0.1% by weight (calculated as $SiO_2$) based on the weight of the black magnetic iron oxide particles. Then, the resultant mixture was further stirred for 30 minutes while maintaining the pH value thereof at 7 to 9. Thereafter, the mixture was filtered, washed with water and then dried at 60° C., thereby obtaining black magnetic iron oxide particles coated with hydroxide of silicon.

The thus obtained black magnetic iron oxide particles had an average particle diameter of 0.24 $\mu$m; a BET specific surface area value of 7.8 $m^2/g$; a saturation magnetization value of 82.4 $Am^2/kg$; a blackness (a* value) of +0.3; an electrification saturation time of 35 minutes; a compression degree of 40; and an oil absorption of 17 ml/100 g.

Main production conditions are shown in Table 7, and various properties of the obtained black magnetic iron oxide particles are shown in Table 8.

Examples 20 to 22

The same procedure as defined in Example 19 was conducted except that the surface-treating conditions were changed variously, thereby obtaining black magnetic iron oxide particles.

Main production conditions are shown in Table 7, and various properties of the obtained black magnetic iron oxide particles are shown in Table 8. The shape, average particle diameter and FeO content of the obtained black magnetic iron oxide particles were substantially the same as those of Example 1.

Example 23

9.9 kg of the black magnetic iron oxide particles obtained in Example 1 and 125 g of colloidal silica having a BET specific surface area value of 170 $m^2/g$ ("SNOWTEX ST-40", produced by Nissan Kagaku Co., Ltd.; purity: 40% (calculated as oxide)) were charged into a Simpson mix muller "Sand Mill MPUV-2" (manufactured by Matsumoto Chuzo Tekkosho Co., Ltd.), and mixed at a linear load of 50 kg/cm for 60 minutes, thereby adhering fine silica particles onto the surface of the black magnetic iron oxide particles.

The amount of the fine oxide particles adhered onto the surface of the thus obtained black magnetic iron oxide particles was 0.5% by weight (calculated as $SiO_2$), and the obtained black magnetic iron oxide particles had a BET specific surface area value of 7.6 $m^2/g$; a saturation magnetization value of 82.3 $Am^2/kg$; a blackness (a* value) of +0.5; an electrification saturation time of 5 minutes; a compression degree of 42; and an oil absorption of 16 ml/100 g.

Main production conditions are shown in Table 9, and various properties of the obtained black magnetic iron oxide particles are shown in Table 10.

Examples 24 to 27

The same procedure as defined in Example 23 was conducted except that the surface-treating conditions were changed variously, thereby obtaining black magnetic iron oxide particles.

Main production conditions are shown in Table 9, and various properties of the obtained black magnetic iron oxide particles are shown in Table 10. The shape, average particle diameter and FeO content of the obtained black magnetic iron oxide particles were substantially the same as those of Example 1.

Example 28

1,900 g of fine titanium oxide particles ("P-21", produced by Nippon Aerosol Co., Ltd.; BET specific surface area value: 170 $m^2/g$; average diameter of primary particle: 21 nm) and 100 g of a silane-coupling agent ("KBM-13" (methyl silane), produced by Shinetsu Silicone Co., Ltd.) were charged into a Simpson mix muller "Sand Mill MPUV-2" (manufactured by Matsumoto Chuzo Tekkosho Co., Ltd.), and mixed at a linear load of 50 kg/cm for 60 minutes, thereby obtaining silane-treated fine titanium oxide particles.

100 g of the thus obtained silane-treated fine titanium oxide particles, 9.9 kg of the black magnetic iron oxide particles obtained in Example 1 were charged into a Simpson mix muller "Sand Mill MPUV-2" (manufactured by Matsumoto Chuzo Tekkosho Co., Ltd.), and mixed at a linear load of 50 kg/cm for 60 minutes, thereby adhering the silane-treated fine titanium oxide particles onto the surface of the black magnetic iron oxide particles.

The amount of the fine oxide particles adhered onto the thus obtained black magnetic iron oxide particles was 1.0% by weight (calculated as $TiO_2$), and the obtained black magnetic iron oxide particles had a BET specific surface area value of 7.7 $m^2/g$; a saturation magnetization value of 81.7 $Am^2/kg$; a blackness (a* value) of +0.5; an electrification saturation time of 5 minutes; a compression degree of 44; and an oil absorption of 16 ml/100 g.

Main production conditions are shown in Table 9, and various properties of the obtained black magnetic iron oxide particles are shown in Table 10. The shape, average particle diameter and FeO content of the obtained black magnetic iron oxide particles were substantially the same as those of Example 1.

Example 29

The same procedure as defined in Example 28 was conducted except that the surface-treating conditions were changed variously, thereby obtaining black magnetic iron oxide particles. Meanwhile, as the fine silica particles treated with a silane compound, there were used fine silica particles "R812" produced by Nippon Aerosol Co., Ltd. which were surface-treated with a compound having a trimethylsilyl group.

Main production conditions are shown in Table 9, and various properties of the obtained black magnetic iron oxide particles are shown in Table 10. The shape, average particle diameter and FeO content of the obtained black magnetic iron oxide particles were substantially the same as those of Example 1.

Use Examples 2 to 14 and Comparative Use Examples 1 to 7

The same procedure as defined in Magnetic Toner Production Method was conducted except that magnetic particles used therein were changed variously, thereby obtaining magnetic toners.

Various properties of the obtained magnetic toners are shown in Table 4.

Use Examples 15 to 29

The same procedure as defined in Magnetic Toner Production Method was conducted except that magnetic particles used therein were changed variously, thereby obtaining magnetic toners.

Various properties of the obtained magnetic toners are shown in Tables 11 to 13.

TABLE 1

| Examples and Comparative Examples | Method for oxidation reaction | Oxidation reaction for first phase: Fe compound | Amount of Fe compound (mol) | Alkali hydroxide (equivalent ratio) |
|---|---|---|---|---|
| Example 2 | (1) | Ferrous sulfate | 41.6 | 0.95 |
| Example 3 | (2) | Ferrous sulfate | 32.0 | 0.95 |
| Example 4 | (1) | Ferrous sulfate | 41.6 | 0.95 |
| Example 5 | (1) | Ferrous sulfate | 41.6 | 0.95 |
| Example 6 | (3) | Ferrous sulfate | 32.0 | 0.95 |
| Example 7 | (4) | Ferrous sulfate | 32.0 | 0.95 |
| Example 8 | (4) | Ferrous sulfate | 32.0 | 0.95 |
| Example 9 | (2) | Ferrous sulfate | 32.0 | 1.06 |
| Example 10 | (4) | Ferrous sulfate | 32.0 | 1.06 |
| Example 11 | (3) | Ferrous sulfate | 32.0 | 0.90 |
| Example 12 | (1) | Ferrous sulfate | 41.6 | 0.90 |
| Example 13 | (2) | Ferrous sulfate | 12.0 | 0.95 |
| Example 14 | (4) | Ferrous sulfate | 28.0 | 0.95 |
| Comparative Example 1 | (2) | Ferrous sulfate | 32.0 | 0.95 |
| Comparative Example 2 | (2) * | Ferrous sulfate | 32.0 | 0.95 |
| Comparative Example 3 | (3) | Ferrous sulfate | 32.0 | 0.95 |
| Comparative Example 4 | (4) | Ferrous sulfate | 32.0 | 0.95 |
| Comparative Example 5 | (1) | Ferrous sulfate | 32.0 | 0.95 |
| Comparative Example 6 | (4) | Ferrous sulfate | 32.0 | 1.00 |
| Comparative Example 7 | (3) | Ferrous sulfate | 32.0 | 0.95 |

| Examples and Comparative Examples | Oxidation reaction for first phase: Kind of compound added | Amount (mol) | pH (acid/alkali added) |
|---|---|---|---|
| Example 2 | Manganese sulfate | 0.584 | 6.7 |
| Example 3 | Manganese sulfate | 0.270 | 6.7 |

TABLE 1-continued

| | | | |
|---|---|---|---|
| Example 4 | Manganese sulfate | 0.292 | 6.7 |
| Example 5 | Zinc sulfate | 0.074 | 6.7 |
| Example 6 | Zinc sulfate | 0.068 | 8.5 |
| Example 7 | Zinc sulfate | 2.254 | 6.7 |
| Example 8 | Manganese sulfate | 0.116 | 8.5–9.0 |
| Example 9 | Manganese sulfate | 0.562 | 10.5 |
| Example 10 | Manganese sulfate | 0.062 | 10.5 |
| | Zinc sulfate | 0.052 | |
| Example 11 | Manganese sulfate | 0.103 | 6.3 |
| | Zinc sulfate | 0.087 | |
| Example 12 | Zinc sulfate | 0.196 | 6.3 |
| Example 13 | Manganese sulfate | 0.112 | 6.7 |
| Example 14 | Manganese sulfate | 2.664 | 6.7 |
| Comparative Example 1 | None | 0.000 | 6.7 |
| Comparative Example 2 | Manganese sulfate | 0.725 | 6.7 |
| | Zinc sulfate | 0.609 | |
| Comparative Example 3 | None | 0.000 | 6.7 |
| Comparative Example 4 | Nickel sulfate | 0.210 | 6.7 |
| Comparative Example 5 | Nickel sulfate | 0.210 | 6.7 |
| Comparative Example 6 | Manganese sulfate | 0.506 | 10.4 |
| Comparative Example 7 | None | 0.000 | 4–7 |

| Examples and Comparative Examples | Oxidation reaction for second phase | | | |
|---|---|---|---|---|
| | Amount of Fe compound (mol) | Kind of compound added | Amount (mol) | pH (acid/alkali added) |
| Example 2 | Formed at end of first stage reaction | | | 9 |
| Example 3 | 6.4 | None | 0 | 9 |
| Example 4 | Formed at end of first stage reaction | | | 9 |
| Example 5 | Formed at end of first stage reaction | | | 9 |
| Example 6 | Formed at end of first stage reaction | | | 9 |
| Example 7 | 4 | None | 0.000 | 9 |
| Example 8 | 4 | None | 0 | 7 |
| Example 9 | 8 | None | 0 | 7 |
| Example 10 | 4 | None | 0 | 7 |
| Example 11 | Formed at end of first stage reaction | | | |
| Example 12 | Formed at end of first stage reaction | | | 9 |
| Example 13 | 28 | None | 0.000 | 9 |
| Example 14 | 4 | None | 0.000 | 9 |
| Comparative Example 1 | 6.4 | None | 0.000 | 9 |
| Comparative Example 2 | Second phase was not formed | | | |
| Comparative Example 3 | Residue | None | 0.000 | 10.4 |
| Comparative Example 4 | 2.4 | None | 0.000 | 7 |
| Comparative Example 5 | Residue | Manganese sulfate | 0.090 | 7 |
| Comparative Example 6 | 1.6 | None | 0.000 | 9 |
| Comparative Example 7 | Residue | None | 0.000 | 7 |

| Examples and Comparative Examples | Oxidation reaction for third phase | | | |
|---|---|---|---|---|
| | Amount of Fe compound (mol) | Kind of compound added | Amount (mol) | pH (acid/alkali added) |
| Example 2 | Residue | Manganese sulfate | 0.175 | 9 |
| Example 3 | Residue | Copper sulfate | 0.093 | 9 |
| Example 4 | Residue | Zinc sulfate | 0.246 | 9 |
| Example 5 | Residue | Zinc sulfate | 0.123 | 9 |
| Example 6 | 6.4 | Zinc sulfate | 0.117 | 7 |
| Example 7 | 9 | Zinc sulfate | 0.127 | 9 |
| Example 8 | 7 | Nickel sulfate | 0.272 | 10 |
| Example 9 | Residue | Nickel sulfate | 0.105 | 9 |
| | | Zinc sulfate | 0.142 | |
| Example 10 | 8 | Zinc sulfate | 0.052 | 7 |
| Example 11 | 4.8 | Copper sulfate | 0.067 | 7 |
| | | Zinc sulfate | 0.152 | |
| Example 12 | Residue | Manganese sulfate | 0.175 | 9 |
| Example 13 | Residue | Zinc sulfate | 0.142 | 9 |
| Example 14 | 12.5 | Zinc sulfate | 2.798 | 9 |
| Comparative Example 1 | Residue | Manganese sulfate | 1.079 | 7 |
| | | Zinc sulfate | 0.181 | |
| Comparative Example 2 | 2.4 | Manganese sulfate | 0.242 | 7 |
| | | Zinc sulfate | 0.203 | |
| Comparative Example 3 | 6.4 | None | 0.000 | 10.4 |
| Comparative Example 4 | 4 | None | 0.000 | 7 |
| Comparative Example 5 | Residue | Copper sulfate | 0.078 | 7 |
| Comparative Example 6 | 2.4 | None | 0.000 | 7 |
| Comparative Example 7 | 6.4 | None | 0.000 | 7 |

Note:
* Mn and Zn were dropped during the reaction

TABLE 2

| Examples and Comparative Examples | Kind and amount of element contained and configuration of second and third phases First phase (inside) Element other than Fe contained | |
|---|---|---|
| | Kind | Amount (wt. %) |
| Example 2 | Mn | 0.99 |
| Example 3 | Mn | 0.50 |
| Example 4 | Mn | 0.50 |
| Example 5 | Zn | 0.15 |
| Example 6 | Zn | 0.15 |
| Example 7 | Zn | 4.00 |
| Example 8 | Mn | 0.20 |
| Example 9 | Mn | 1.00 |
| Example 10 | Mn | 0.10 |
| | Zn | 0.10 |
| Example 11 | Mn | 0.20 |
| | Zn | 0.20 |
| Example 12 | Zn | 0.39 |
| Example 13 | Mn | 0.20 |
| Example 14 | Mn | 4.01 |
| Comparative Example 1 | None | 0.00 |
| Comparative Example 2 | Mn | 1.50 |
| | Zn | 1.50 |
| Comparative Example 3 | None | 0.00 |
| Comparative Example 4 | Ni | 0.50 |
| Comparative Example 5 | Ni | 0.50 |
| Comparative Example 6 | Mn | 0.20 |
| Comparative Example 7 | None | 0.00 |

| Examples and Comparative Examples | Kind and amount of element contained and configuration of second and third phases Second phase | |
|---|---|---|
| | Kind of element other than Fe contained | Amount (wt. %) |
| Example 2 | None | 0 |
| Example 3 | None | 0 |
| Example 4 | None | 0 |
| Example 5 | None | 0 |
| Example 6 | None | 0 |
| Example 7 | None | 0 |

TABLE 2-continued

| | | |
|---|---|---|
| Example 8 | None | 0 |
| Example 9 | None | 0 |
| Example 10 | None | 0 |
| Example 11 | None | 0 |
| Example 12 | None | 0 |
| Example 13 | None | 0 |
| Example 14 | None | 0 |
| Comparative Example 1 | None | 0 |
| Comparative Example 2 | No second phase was present, and Mn and Zn were continuously present | |
| Comparative Example 3 | None | 0 |
| Comparative Example 4 | None | 0 |
| Comparative Example 5 | Mn | 0.2 |
| Comparative Example 6 | None | 0 |
| Comparative Example 7 | None | 0 |

| Examples and Comparative Examples | Kind and amount of element contained and configuration of second and third phases Second phase t1 (%) | t2 (%) | Configuration |
|---|---|---|---|
| Example 2 | 15 | 5 | Layer |
| Example 3 | 21 | 11 | Layer |
| Example 4 | 15 | 5 | Layer |
| Example 5 | 20 | 15 | Layer |
| Example 6 | 20 | 10 | Layer |
| Example 7 | 28 | 20 | Layer |
| Example 8 | 26 | 16 | Granular |
| Example 9 | 20 | 10 | Granular |
| Example 10 | 28 | 18 | Granular |
| Example 11 | 22 | 13 | Layer |
| Example 12 | 12 | 7 | Layer |
| Example 13 | 70 | 20 | Layer |
| Example 14 | 37 | 28 | Layer |
| Comparative Example 1 | — | 15 | Layer |
| Comparative Example 2 | No second phase was present, and Mn and Zn were continuously present | | |
| Comparative Example 3 | Not determined | | Layer |
| Comparative Example 4 | 20 | — | Granular |
| Comparative Example 5 | 12 | 7 | Granular |
| Comparative Example 6 | 11 | — | Layer |
| Comparative Example 7 | Not determined | | Granular |

| Examples and Comparative Examples | Kind and amount of element contained and configuration of second and third phases Third phase (outside) Kind of element other than Fe contained | Amount (wt. %) | Configuration |
|---|---|---|---|
| Example 2 | Mn | 0.30 | Layer |
| Example 3 | Cu | 0.20 | Granular |
| Example 4 | Zn | 0.50 | Layer |
| Example 5 | Zn | 0.25 | Layer |
| Example 6 | Zn | 0.25 | Granular |
| Example 7 | Zn | 2.00 | Granular |
| Example 8 | Ni | 0.50 | Layer |
| Example 9 | Ni<br>Zn | 0.20<br>0.30 | Layer |
| Example 10 | Zn | 0.10 | Granular |
| Example 11 | Cu<br>Zn | 0.15<br>0.35 | Granular |
| Example 12 | Mn | 0.29 | Layer |
| Example 13 | Zn | 0.30 | Layer |
| Example 14 | Zn | 4.98 | Layer |
| Comparative Example 1 | Mn<br>Zn | 2.00<br>0.40 | Granular |
| Comparative Example 2 | Mn<br>Zn | 0.50<br>0.50 | Granular |
| Comparative Example 3 | None | 0.00 | Layer |
| Comparative Example 4 | None | 0.00 | Granular |
| Comparative Example 5 | Cu | 0.20 | Granular |
| Comparative Example 6 | None | 0.00 | Granular |
| Comparative Example 7 | None | 0.00 | Granular |

TABLE 3

| Examples and Comparative Examples | Properties of black magnetic iron oxide particles Shape | Average particle diameter (μm) | BET specific surface area ($m^2/g$) | σs ($Am^2/kg$) |
|---|---|---|---|---|
| Example 2 | Spherical | 0.24 | 7.0 | 82.9 |
| Example 3 | Spherical | 0.06 | 14.2 | 82.1 |
| Example 4 | Spherical | 0.18 | 9.7 | 84.8 |
| Example 5 | Spherical | 0.20 | 9.3 | 85.6 |
| Example 6 | Hexahedral | 0.24 | 6.1 | 90.1 |
| Example 7 | Spherical | 0.10 | 11.8 | 90.3 |
| Example 8 | Hexahedral | 0.10 | 10.4 | 83.5 |
| Example 9 | Octahedral | 0.25 | 5.9 | 89.6 |
| Example 10 | Octahedral | 0.35 | 4.5 | 91.2 |
| Example 11 | Polyhedral | 0.16 | 9.3 | 88.1 |
| Example 12 | Polyhedral | 0.28 | 6.8 | 88.6 |
| Example 13 | Hexahedral | 0.30 | 5.1 | 89.1 |
| Example 14 | Spherical | 0.31 | 6.0 | 86.5 |
| Comparative Example 1 | Spherical | 0.25 | 6.7 | 85.0 |
| Comparative Example 2 | Spherical | 0.35 | 4.6 | 87.2 |
| Comparative Example 3 | Spherical | 0.25 | 6.6 | 83.8 |
| Comparative Example 4 | Spherical | 0.08 | 13.5 | 82.1 |
| Comparative Example 5 | Spherical | 0.12 | 11.5 | 82.3 |
| Comparative Example 6 | Octahedral | 0.25 | 6.0 | 83.0 |
| Comparative Example 7 | Spherical | 0.24 | 6.7 | 84.8 |

| Examples and Comparative Examples | Properties of black magnetic iron oxide particles Charge amount (μC/g) 1 minute | 3 minutes | 5 minutes |
|---|---|---|---|
| Example 2 | −16 | −17 | −17 |
| Example 3 | −17 | −18 | −19 |
| Example 4 | −21 | −22 | −23 |
| Example 5 | −16 | −18 | −19 |
| Example 6 | −17 | −19 | −19 |
| Example 7 | −19 | −20 | −21 |
| Example 8 | −14 | −15 | −16 |
| Example 9 | −15 | −16 | −17 |
| Example 10 | −15 | −16 | −17 |
| Example 11 | −16 | −17 | −18 |
| Example 12 | −18 | −19 | −20 |
| Example 13 | −16 | −17 | −18 |
| Example 14 | −18 | −20 | −20 |
| Comparative Example 1 | −7 | −10 | −12 |
| Comparative Example 2 | −5 | −11 | −14 |

TABLE 3-continued

| | | | |
|---|---|---|---|
| Comparative Example 3 | −3 | −6 | −8 |
| Comparative Example 4 | −4 | −7 | −9 |
| Comparative Example 5 | −4 | −6 | −8 |
| Comparative Example 6 | −3 | −5 | −8 |
| Comparative Example 7 | −3 | −5 | −8 |

| Examples and Comparative Examples | Properties of black magnetic iron oxide particles Charge amount (μC/g) | | |
|---|---|---|---|
| | 10 minute | 15 minutes | 20 minutes |
| Example 2 | −17 | −17 | −17 |
| Example 3 | −19 | −19 | −19 |
| Example 4 | −23 | −23 | −23 |
| Example 5 | −19 | −19 | −19 |
| Example 6 | −19 | −19 | −19 |
| Example 7 | −21 | −21 | −21 |
| Example 8 | −16 | −16 | −16 |
| Example 9 | −17 | −17 | −17 |
| Example 10 | −17 | −17 | −17 |
| Example 11 | −18 | −18 | −18 |
| Example 12 | −20 | −20 | −20 |
| Example 13 | −18 | −18 | −18 |
| Example 14 | −20 | −20 | −20 |
| Comparative Example 1 | −13 | −14 | −14 |
| Comparative Example 2 | −15 | −16 | −16 |
| Comparative Example 3 | −9 | −10 | −10 |
| Comparative Example 4 | −10 | −11 | −11 |
| Comparative Example 5 | −9 | −10 | −10 |
| Comparative Example 6 | −9 | −10 | −10 |
| Comparative Example 7 | −9 | −10 | −10 |

| Examples and Comparative Examples | Properties of black magnetic iron oxide particles | | |
|---|---|---|---|
| | $SiO_2$ (wt. %) | FeO (wt. %) | a* |
| Example 2 | 1.00 | 20.7 | +0.5 |
| Example 3 | 1.50 | 17.4 | +0.9 |
| Example 4 | 2.00 | 19.7 | +0.7 |
| Example 5 | 1.50 | 19.9 | +0.8 |
| Example 6 | 0.50 | 24.6 | +0.4 |
| Example 7 | 2.00 | 20.1 | +0.3 |
| Example 8 | 0.00 | 22.9 | +0.7 |
| Example 9 | 0.30 | 26.9 | +0.3 |
| Example 10 | 0.30 | 27.2 | +0.1 |
| Example 11 | 1.00 | 23.2 | +0.3 |
| Example 12 | 2.00 | 24.1 | +0.2 |
| Example 13 | 1.50 | 25.3 | +0.1 |
| Example 14 | 1.00 | 23.5 | +0.7 |
| Comparative Example 1 | 0.00 | 21.5 | +1.3 |
| Comparative Example 2 | 1.00 | 22.2 | +1.1 |
| Comparative Example 3 | 1.00 | 21.4 | +1.9 |
| Comparative Example 4 | 1.50 | 18.3 | +2.2 |
| Comparative Example 5 | 1.50 | 18.6 | +1.1 |
| Comparative Example 6 | 1.50 | 25.8 | +0.4 |
| Comparative Example 7 | 1.00 | 11.8 | +3.2 |

TABLE 3-continued

| Examples and Comparative Examples | Properties of black magnetic iron oxide particles | |
|---|---|---|
| | Electrical resistance | Change rate of charge amount |
| Example 2 | A | A |
| Example 3 | A | A |
| Example 4 | A | A |
| Example 5 | A | A |
| Example 6 | A | A |
| Example 7 | A | A |
| Example 8 | A | A |
| Example 9 | A | A |
| Example 10 | A | A |
| Example 11 | A | A |
| Example 12 | A | A |
| Example 13 | A | B |
| Example 14 | A | A |
| Comparative Example 1 | B | C |
| Comparative Example 2 | B | C |
| Comparative Example 3 | C | D |
| Comparative Example 4 | C | D |
| Comparative Example 5 | B | C |
| Comparative Example 6 | C | C |
| Comparative Example 7 | A | C |

TABLE 4

| Use Examples and Comparative Use Examples | Magnetic particles used |
|---|---|
| Use Example 2 | Magnetic particles obtained in Example 2 |
| Use Example 3 | Magnetic particles obtained in Example 3 |
| Use Example 4 | Magnetic particles obtained in Example 4 |
| Use Example 5 | Magnetic particles obtained in Example 5 |
| Use Example 6 | Magnetic particles obtained in Example 6 |
| Use Example 7 | Magnetic particles obtained in Example 7 |
| Use Example 8 | Magnetic particles obtained in Example 8 |
| Use Example 9 | Magnetic particles obtained in Example 9 |
| Use Example 10 | Magnetic particles obtained in Example 10 |
| Use Example 11 | Magnetic particles obtained in Example 11 |
| Use Example 12 | Magnetic particles obtained in Example 12 |
| Use Example 13 | Magnetic particles obtained in Example 13 |
| Use Example 14 | Magnetic particles obtained in Example 14 |
| Comparative Use Example 1 | Magnetic particles obtained in Comparative Example 1 |
| Comparative Use Example 2 | Magnetic particles obtained in Comparative Example 2 |
| Comparative Use Example 3 | Magnetic particles obtained in Comparative Example 3 |
| Comparative Use Example 4 | Magnetic particles obtained in Comparative Example 4 |
| Comparative Use Example 5 | Magnetic particles obtained in Comparative Example 5 |
| Comparative Use Example 6 | Magnetic particles obtained in Comparative Example 6 |
| Comparative Use Example 7 | Magnetic particles obtained in Comparative Example 7 |

| Use Examples and Comparative Use Examples | Magnetic toner | | |
|---|---|---|---|
| | Change rate of charge amount | Image density under L/L conditions | Image density under H/H conditions |
| Use Example 2 | A | A | A |
| Use Example 3 | A | A | A |

TABLE 4-continued

| | | | |
|---|---|---|---|
| Use Example 4 | A | A | A |
| Use Example 5 | A | A | A |
| Use Example 6 | A | A | A |
| Use Example 7 | A | A | A |
| Use Example 8 | A | A | A |
| Use Example 9 | A | A | A |
| Use Example 10 | A | A | A |
| Use Example 11 | A | A | A |
| Use Example 12 | A | A | A |
| Use Example 13 | B | B | B |
| Use Example 14 | A | A | A |
| Comparative Use Example 1 | C | C | D |
| Comparative Use Example 2 | C | C | D |
| Comparative Use Example 3 | D | D | D |
| Comparative Use Example 4 | D | D | D |
| Comparative Use Example 5 | C | C | D |
| Comparative Use Example 6 | D | C | D |
| Comparative Use Example 7 | Unusable because of strong reddish color | | |

TABLE 6-continued

| Examples | Charge amount (μC/g) | | |
|---|---|---|---|
| | 10 minute | 15 minutes | 20 minutes |
| Example 15 | −10 | −10 | −10 |
| Example 16 | −5 | −5 | −5 |
| Example 17 | 20 | 20 | 20 |
| Example 18 | 5 | 5 | 5 |

| Examples | a* | Electrical resistance (Ω · cm) |
|---|---|---|
| Example 15 | +0.4 | A |
| Example 16 | +0.4 | A |
| Example 17 | +0.5 | A |
| Example 18 | +0.4 | A |

| Examples | Change rate of charge amount | Dispersibility: Liquid absorption (ml/100 g) | Dispersibility: Gloss of molded resin (incident and reflection angles: 20°) (%) |
|---|---|---|---|
| Example 15 | A | 7.2 | 94.0 |
| Example 16 | A | 7.1 | 93.5 |
| Example 17 | A | 5.7 | 93.0 |
| Example 18 | A | 6.9 | 93.5 |

TABLE 5

| Examples | Core particles to be treated | Organic compound having hydrophobic group: Kind | Amount added (wt. %) | Treating apparatus | Linear load (kg/cm) | Operating time (min) |
|---|---|---|---|---|---|---|
| Example 15 | Black magnetite iron oxide particles obtained in Example 1 | Silane-based coupling agent ("A-187" produced by Nippon Unicar Co., Ltd.) | 1 | Simpson mix muller MPUV-2 | 30 | 60 |
| Example 16 | Black magnetite iron oxide particles obtained in Example 1 | Silane-based coupling agent ("A-187" produced by Nippon Unicar Co., Ltd.) | 2 | Simpson mix muller MPUV-2 | 60 | 60 |
| Example 17 | Black magnetite iron oxide particles obtained in Example 1 | Titanium-based coupling agent ("PLAIN-ACT TTS" produced by Ajinomoto Co., Ltd.) | 4 | Simpson mix muller MPUV-2 | 40 | 60 |
| Example 18 | Black magnetite iron oxide particles obtained in Example 1 | Silane-based coupling agent "KBM-1003" produced by Shinetsu Kagaku Co ., Ltd.) | 2 | Simpson mix muller MPUV-2 | 60 | 45 |

TABLE 6

| Examples | BET specific surface area value ($m^2/g$) | Magnetic properties: Saturation magnetization value ($Am^2/kg$) |
|---|---|---|
| Example 15 | 7.0 | 81.6 |
| Example 16 | 6.5 | 81.0 |
| Example 17 | 5.0 | 80.0 |
| Example 18 | 6.4 | 81.1 |

| Examples | Charge amount (μC/g) | | |
|---|---|---|---|
| | 1 minute | 3 minutes | 5 minutes |
| Example 15 | −9 | −10 | −10 |
| Example 16 | −4 | −5 | −5 |
| Example 17 | 18 | 19 | 20 |
| Example 18 | 3 | 4 | 5 |

TABLE 7

| Examples | Core particles to be treated |
|---|---|
| Example 19 | Black magnetite iron oxide particles obtained in Example 1 |
| Example 20 | Black magnetite iron oxide particles obtained in Example 1 |
| Example 21 | Black magnetite iron oxide particles obtained in Example 1 |

TABLE 7-continued

| | |
|---|---|
| Example 22 | Black magnetite iron oxide particles obtained in Example 1 |

| Examples | Coating treatment with oxides and hydroxides: Kind | Amount added (calculated as) (wt. %) | pH value adjusted |
|---|---|---|---|
| Example 19 | Water glass #3 | 0.1 ($SiO_2$) | 7–9 |
| Example 20 | Aluminum sulfate | 0.2 (Al) | 7 |
| Example 21 | Aluminum sulfate | 0.5 (Al) | 7 |
| Example 22 | Water glass #3 | 0.1 ($SiO_2$) | 7–9 |
| | Aluminum sulfate | 0.3 (Al) | |

TABLE 8

| Examples | Amount of compound adhered (calculated as) (wt. %) | BET specific surface area value ($m^2/g$) |
|---|---|---|
| Example 19 | 0.09 ($SiO_2$) | 7.8 |
| Example 20 | 0.20 (Al) | 8.0 |
| Example 21 | 0.49 (Al) | 9.3 |
| Example 22 | 0.10 ($SiO_2$) | 8.5 |
| | 0.30 (Al) | |

| Examples | ΔBET ($m^2/g$) | Magnetic properties: Saturation magnetization value ($Am^2/kg$) |
|---|---|---|
| Example 19 | 0.3 | 82.4 |
| Example 20 | 0.5 | 82.2 |
| Example 21 | 1.8 | 82.0 |
| Example 22 | 1.0 | 82.1 |

TABLE 8-continued

| Examples | Charge amount (μC/g) 1 minute | 3 minutes | 5 minutes |
|---|---|---|---|
| Example 19 | −19 | −20 | −20 |
| Example 20 | −13 | −14 | −14 |
| Example 21 | −11 | −12 | −12 |
| Example 22 | −14 | −15 | −15 |

| Examples | Charge amount (μC/g) 10 minute | 15 minutes | 20 minutes |
|---|---|---|---|
| Example 19 | −20 | −20 | −20 |
| Example 20 | −14 | −14 | −14 |
| Example 21 | −12 | −12 | −12 |
| Example 22 | −15 | −15 | −15 |

| Examples | a* | Electrical resistance (Ω · cm) | Change rate of charge amount |
|---|---|---|---|
| Example 19 | +0.3 | A | A |
| Example 20 | +0.3 | A | A |
| Example 21 | +0.4 | A | A |
| Example 22 | +0.3 | A | A |

| Examples | Compression degree | Oil absorption (ml/100 g) |
|---|---|---|
| Example 19 | 40 | 17 |
| Example 20 | 41 | 17 |
| Example 21 | 43 | 18 |
| Example 22 | 40 | 16 |

TABLE 9

| Examples | Core particles to be treated | Coating treatment with fine oxide particles: Kind | Kind of fine particles | Amount added (wt. %) | Treating apparatus | Linear load (kg/cm) | Operating time (min) |
|---|---|---|---|---|---|---|---|
| Example 23 | Black magnetite iron oxide particles obtained in Example 1 | Fine silica particles ("ST-40" produced by Nissan Kagaku Co., Ltd.) | $SiO_2$ | 0.5 | Simpson mix muller MPUV-2 | 50 | 60 |
| Example 24 | Black magnetite iron oxide particles obtained in Example 1 | Fine silica particles ("ST-40" produced by Nissan Kagaku Co., Ltd.) | $SiO_2$ | 1 | Simpson mix muller MPUV-2 | 80 | 60 |
| Example 25 | Black magnetite iron oxide particles obtained in Example 1 | Fine titanium oxide particles ("P-25" produced by Nippon Aerosol Co., Ltd.) | $TiO_2$ | 1 | Simpson mix muller MPUV-2 | 60 | 60 |
| Example 26 | Black magnetite iron oxide particles obtained in Example 1 | Fine titanium oxide particles ("P-25" produced by Nippon Aerosol Co., Ltd.) | $TiO_2$ | 2 | Simpson mix muller MPUV-2 | 60 | 60 |
| Example 27 | Black magnetite iron oxide particles obtained in Example 1 | Fine alumina particles ("AS-520" produced by Nissan Kagaku Co., Ltd.) | $Al_2O_3$ | 1 | Simpson mix muller MPUV-2 | 60 | 60 |
| Example 28 | Black magnetite iron oxide particles obtained in Example 1 | Fine titanium oxide particles treated with silane compound | $TiO_2$ | 1 | Simpson mix muller MPUV-2 | — | — |

TABLE 9-continued

| Examples | Core particles to be treated | Coating treatment with fine oxide particles: Kind | Kind of fine particles | Amount added (wt. %) | Treating apparatus | Linear load (kg/cm) | Operating time (min) |
|---|---|---|---|---|---|---|---|
| Example 29 | Black magnetite iron oxide particles obtained in Example 1 | Fine silica particles treated with silane compound ("RB-12" produced by Nippon Aerosol Co., Ltd.) | $SiO_2$ | 5 | Simpson mix muller MPUV-2 | 60 | 60 |

TABLE 10

| Examples | Kind of fine particles adhered | Amount of fine particles adhered (wt. %) | BET specific surface area value ($m^2$/g) | ΔBET ($m^2$/g) | Magnetic properties: Saturation magnetization value ($Am^2$/kg) | Charge amount (μC/g) 1 minute | 3 minutes | 5 minutes |
|---|---|---|---|---|---|---|---|---|
| Example 23 | $SiO_2$ | 0.5 | 7.6 | 0.1 | 82.3 | −23 | −24 | −25 |
| Example 24 | $SiO_2$ | 1.0 | 7.9 | 0.4 | 81.7 | −30 | −34 | −35 |
| Example 25 | $TiO_2$ | 1.0 | 7.8 | 0.3 | 81.8 | −28 | −30 | −30 |
| Example 26 | $TiO_2$ | 1.9 | 8.4 | 0.9 | 81.0 | −38 | −39 | −40 |
| Example 27 | $Al_2O_3$ | 1.0 | 9.0 | 1.5 | 81.7 | 4 | 4.6 | 5 |
| Example 28 | $TiO_2$ coated with silane compound | 1.0 | 7.7 | 0.2 | 81.7 | −29 | −30 | −31 |
| Example 29 | $SiO_2$ coated with silane compound | 1.0 | 7.9 | 0.4 | 81.5 | −28 | −30 | −33 |

| Examples | Charge amount (μC/g) 10 minute | 15 minutes | 20 minutes | a* | Electrical resistance (Ω·cm) | Change rate of charge amount | Compression degree | Oil absorption (ml/100 g) |
|---|---|---|---|---|---|---|---|---|
| Example 23 | −25 | −25 | −25 | +0.5 | A | A | 42 | 16 |
| Example 24 | −35 | −35 | −35 | +0.5 | A | A | 43 | 17 |
| Example 25 | −30 | −30 | −30 | +0.5 | A | A | 43 | 15 |
| Example 26 | −40 | −40 | −40 | +0.5 | A | A | 45 | 16 |
| Example 27 | 5 | 5 | 5 | +0.5 | A | A | 43 | 16 |
| Example 28 | −31 | −31 | −31 | +0.5 | A | A | 44 | 16 |
| Example 29 | −33 | −33 | −33 | +0.5 | A | A | 44 | 16 |

TABLE 11

| Use Examples | Kind of black magnetic iron oxide particles | Properties of magnetic toner: Change rate of charge amount | Image density under L/L conditions | Image density under H/H conditions | Dispersibility of black magnetic iron oxide particles in toner | Image density after being durable-treated under H/H conditions |
|---|---|---|---|---|---|---|
| Use Example 15 | Example 15 | A | A | A | A | A |
| Use Example 16 | Example 16 | A | A | A | A | A |
| Use Example 17 | Example 17 | A | A | A | A | A |
| Use Example 18 | Example 18 | A | A | A | A | A |

TABLE 12

| Use Examples | Kind of black magnetic iron oxide particles | Properties of magnetic toner: Change rate of charge amount | Image density under L/L conditions | Image density under H/H conditions | Distribution of charge amount of toner | Fogging of toner |
|---|---|---|---|---|---|---|
| Use Example 19 | Example 19 | A | A | A | A | A |
| Use Example 20 | Example 20 | A | A | A | A | A |
| Use Example 21 | Example 21 | A | A | A | A | A |
| Use Example 22 | Example 22 | A | A | A | A | A |

TABLE 13

| | Kind of black | Properties of magnetic toner | | | | |
|---|---|---|---|---|---|---|
| Use Examples | magnetic iron oxide particles | Change rate of charge amount | Image density under L/L conditions | Image density under H/H conditions | Fluidity index | Fluidity index under H/H conditions |
| Use Example 23 | Example 23 | A | A | A | 75 | 65 |
| Use Example 24 | Example 24 | A | A | A | 75 | 65 |
| Use Example 25 | Example 25 | A | A | A | 75 | 65 |
| Use Example 26 | Example 26 | A | A | A | 75 | 65 |
| Use Example 27 | Example 27 | A | A | A | 75 | 65 |
| Use Example 28 | Example 28 | A | A | A | 80 | 75 |
| Use Example 29 | Example 29 | A | A | A | 80 | 75 |

What is claimed is:

1. Black magnetic iron oxide particles having a three-phase structure comprising:

a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles;

a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; and an intermediate layer disposed between the core portion and the surface coat portion, containing substantially none of the metal elements other than Fe, and having an average particle diameter of 0.05 to 1.0 μm.

2. Black magnetic iron oxide particles according to claim 1, wherein the total content of the metal element other than Fe in the particles is 0.1 to 20% by weight, calculated as the metal element, based on the total weight of the particles.

3. Black magnetic iron oxide particles according to claim 1, wherein a total content of FeO in the particles is 16.0 to 28.0% by weight based on the total weight of the particles.

4. Black magnetic iron oxide particles according to claim 1, which have an a* value of not more than 1.0.

5. Black magnetic iron oxide particles according to claim 1, wherein a silicon compound is present in the intermediate layer, the surface coat portion, or the intermediate layer and the surface coat portion of the black magnetic iron oxide particles.

6. Black magnetic iron oxide particles according to claim 1, further comprising a coating comprising an organic compound having a hydrophobic group disposed on the surface of the black magnetic iron oxide particles.

7. Black magnetic iron oxide particles according to claim 6, wherein the amount of the organic compound having a hydrophobic group is 0.5 to 5 parts by weight based on 100 parts by weight of the black magnetic iron oxide particles.

8. Black magnetic iron oxide particles according to claim 1, further comprising a coating comprising at least one compound selected from the group consisting of hydroxides of aluminum, oxides of aluminum, hydroxides of silicon and oxides of silicon disposed on the surface of the black magnetic iron oxide particles.

9. Black magnetic iron oxide particles according to claim 8, wherein the amount of the compound is 0.01 to 0.5% by weight, calculated as Al, $SiO_2$, or Al and $SiO_2$, based on the weight of the black magnetic iron oxide particles.

10. Black magnetic iron oxide particles according to claim 1, further comprising adhered fine oxide particles containing an element selected from the group consisting of Al, Si, Zr and Ti disposed on the surface of the black magnetic iron oxide particles.

11. Black magnetic iron oxide particles according to claim 10, wherein the amount of the fine oxide particles adhered is 0.1 to 5% by weight based on the weight of the black magnetic iron oxide particles.

12. Black magnetic iron oxide particles according to claim 10, further comprising a coating comprising fine oxide particles coated with at least one compound selected from the group consisting of methylsilane, trimethylsilane and octylsilane disposed on the surface of the black magnetic iron oxide particles.

13. Black magnetic iron oxide particles according to claim 12, wherein the amount of the fine oxide particles adhered is 0.1 to 5% by weight based on the weight of the black magnetic iron oxide particles.

14. A magnetic toner comprising the black magnetic iron oxide particles as defined in claim 1, and a binder resin.

15. A black color pigment comprising the black magnetic iron oxide particles as defined in claim 1.

16. Black magnetic iron oxide particles having a three-phase structure comprising:

a core portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles;

a surface coat portion containing at least one metal element other than Fe selected from the group consisting of Mn, Zn, Cu, Ni, Cr, Cd, Sn, Mg, Ti, Ca and Al in an amount of 0.1 to 10% by weight based on whole Fe contained in the particles; and an intermediate layer disposed between the core portion and the surface coat portion, containing substantially none of the metal elements other than Fe, wherein the content of the metal element other than Fe is 0.1 to 20% by weight, calculated as the metal element, based on the total weight of the particles, and having an average particle diameter of 0.05 to 1.0 μm and a total content of FeO in the particles of 16.0 to 28.0% by weight based on the total weight of the particles.

* * * * *